(12) United States Patent
Tirkkonen et al.

(10) Patent No.: US 7,773,685 B2
(45) Date of Patent: Aug. 10, 2010

(54) TRANSMITTING AND RECEIVING METHODS

(75) Inventors: Olav Tirkkonen, Helsinki (FI); Mikko Kokkonen, Helsinki (FI); Kari Kallojärvi, Kangasala (FI); Rinat Kashaev, Geneva (CH)

(73) Assignee: Nokia Corporation, Espoo (FI)

( * ) Notice: Subject to any disclaimer, the term of this patent is extended or adjusted under 35 U.S.C. 154(b) by 1759 days.

(21) Appl. No.: 10/349,168

(22) Filed: Jan. 23, 2003

(65) Prior Publication Data
US 2004/0002364 A1    Jan. 1, 2004

(30) Foreign Application Priority Data
May 27, 2002    (GB)    ................................ 0212165.5

(51) Int. Cl.
H04B 7/02    (2006.01)
H04L 1/02    (2006.01)

(52) U.S. Cl. ........................ 375/267; 375/347; 375/348; 375/349; 375/364

(58) Field of Classification Search ................ 375/267, 375/260, 233, 347, 144, 299, 268, 295, 259, 375/285, 220, 348, 349; 370/334, 310, 464, 370/208; 455/69, 562.1
See application file for complete search history.

(56) References Cited

U.S. PATENT DOCUMENTS

| | | | | |
|---|---|---|---|---|
| 4,720,712 A | * | 1/1988 | Brookner et al. ............ | 342/383 |
| 5,191,594 A | * | 3/1993 | Argo et al. .................. | 375/130 |
| 6,473,467 B1 | * | 10/2002 | Wallace et al. .............. | 375/267 |
| 6,529,479 B1 | * | 3/2003 | Suzuki ..................... | 370/236.1 |
| 6,584,144 B2 | * | 6/2003 | Alamouti et al. ............ | 375/147 |
| 6,865,237 B1 | * | 3/2005 | Boariu et al. ............... | 375/295 |
| 6,882,618 B1 | * | 4/2005 | Sakoda et al. ............... | 370/208 |
| 6,985,434 B2 | * | 1/2006 | Wu et al. .................... | 370/208 |
| 7,308,019 B2 | * | 12/2007 | Bottomley et al. .......... | 375/142 |
| 2002/0009062 A1 | * | 1/2002 | Proctor et al. ............... | 370/335 |
| 2002/0122465 A1 | * | 9/2002 | Agee et al. .................. | 375/141 |
| 2002/0154705 A1 | * | 10/2002 | Walton et al. ............... | 375/267 |
| 2002/0159506 A1 | * | 10/2002 | Alamouti et al. ............ | 375/147 |

(Continued)

FOREIGN PATENT DOCUMENTS

EP    0 951 091 A2    10/1999

(Continued)

OTHER PUBLICATIONS

Siavash M. Alamouti, "A Simple Transmit Diversity Technique for Wirless Communications", IEEE, Select areas in Communications, vol. 16, No. 8, Oct. 1998.*

(Continued)

Primary Examiner—Chieh M Fan
Assistant Examiner—Qutbuddin Ghulamali
(74) Attorney, Agent, or Firm—Harrington & Smith

(57) ABSTRACT

This invention describes a wireless system comprising a plurality of transmitters and receivers, wherein each transmitter has between 1 and n antennas and each receiver has between 1 and m antennas wherein one of said transmitter is arranged to transmit to one of the receivers, said one transmitter is controlled in dependence on at least one of at least one parameter of said transmitters, at least one parameter of said receiver, and at least one parameter of a wireless environment between said transmitter and said receiver.

63 Claims, 8 Drawing Sheets

U.S. PATENT DOCUMENTS

| | | | | |
|---|---|---|---|---|
| 2005/0117677 | A1* | 6/2005 | Sampath | 375/347 |
| 2005/0185734 | A1* | 8/2005 | Hottinen et al. | 375/295 |
| 2005/0195915 | A1* | 9/2005 | Raleigh et al. | 375/267 |
| 2005/0207505 | A1* | 9/2005 | Lakkis | 375/260 |

FOREIGN PATENT DOCUMENTS

| | | |
|---|---|---|
| EP | 1 195 937 A1 | 4/2002 |
| EP | 1 265 376 A2 | 12/2002 |
| FI | 20011357 | 9/2002 |
| WO | WO 01/45300 A1 | 6/2001 |
| WO | WO 01/78294 A1 | 10/2001 |
| WO | WO 02/01732 A2 | 1/2002 |
| WO | WO02/01732 A2 * | 1/2002 |
| WO | WO 02/01732 A3 | 1/2002 |
| WO | WO 03/001728 A1 | 1/2003 |

OTHER PUBLICATIONS

Bevan D. D. N. et al. "Space-Time Coding For Capacity Enhancement in Future-Generation Wireless Communications Networks" IEE Colloquium on Capacity and Range Enhancement Techniques For the Third Generation Mobile Communications And Beyond, GB, 2000, pp. 8/1-8/11; XP-001020950.

Trikkonen O. et al. "Square-Matrix Embeddable Space-Time Block Codes for Complex Signal Constellations" IEEE Transactions On Information Theory, Feb. 2002, vol. 48, No. 2, pp. 384-395.

Foschini, "Layered Space-Time Architecture for Wireless Communication in a Fading Environment When Using Multi-Element Antennas," Autumn 1996, Bell Labs Technical Journal, pp. 41-59.

Teletar, "Capacity of Multi-Antenna Gaussian Channels," Eur. Trans. Telecomm., Nov.-Dec. 1999, vol. 10, No. 6, pp. 585-595.

Wolniansky et al., "V-Blast: An Architecture for Realizing Very High Data Rates Over the Rich-Scattering Wireless Channel," Proc. URSI Internat. Symposium on Signals, Systems and Electronics, Sep. 1998, pp. 295-300.

Hottinen et al., "Non-Orthogonal Space-Time Block Code with Symbol Rate Two," Conf. on Information Sciences & Systems, Mar. 20-22, 2002, Princeton University, 5 pages.

Hassibi et al., "High-Rate Codes that are Linear in Space and Time," Manuscript, Apr. 24, 2001, pp. 1-56.

Baro et al., "Improving Blast Performance Using Space-Time Block Codes and Turbo Decoding," Proceedings IEEE Globecom '00, Nov. 2000, vol. 2, pp. 1067-1071.

Texas instruments, TSGR1#21(01)-0701, "Double-STTD Scheme for HSDPA Systems with Four Transmit Antennas: Link Level Simulation Results," Jun. 26-28, 2001, Espoo, Finland, pp. 1-19.

Tirkkonen et al., "Minimal Non-Orthogonality Rate 1 Space-Time Block Code for 3+Tx Antennas," IEEE ISSSTA 2000, Sep. 6-8, 2000, vol. 2, New Jersey, pp. 429-432.

* cited by examiner

FIG. 8

For $N_B=4$, $T=4$ System $K=N_B$ use
$$B^{\tilde{4}} = B_0 \cup \tilde{B}_1 \cup \tilde{B}_2 \cup B_3 \cup jB_0 \cup j\tilde{B}_1 \cup j\tilde{B}_2 \cup jB_3$$
or
$$B^4 = B_0 \cup B_1 \cup B_2 \cup B_3 \cup jB_0 \cup jB_1 \cup jB_2 \cup jB_3$$

$K=\frac{3N_B}{4}$ use
$$B^3 = B_0 \cup \tilde{B}_2 \cup jB_0 \cup j\tilde{B}_2 \cup \sqrt{\frac{Nr}{2Nr-1}}(\tilde{B}_1 + jB_3) \cup \sqrt{\frac{Nr}{2Nr-1}}(j\tilde{B}_1 + B_3)$$

$K=\frac{5N_B}{8}$ use
$$B^{5/2} = B_0 \cup \tilde{B}_1 \cup \tilde{B}_2 \cup B_3 \cup jB_0$$

$K=\frac{N_B}{2}$ use
$$B^{\tilde{2}} = B_0 \cup \tilde{B}_1 \cup \tilde{B}_2 \cup B_3$$
or
$$B^2 = B_0 \cup B_1 \cup B_2 \cup B_3$$

$K=\frac{3N_B}{8}$ use
$$B^{3/2} = B_0 \cup e^{j\pi/3} B_1 \cup e^{-j\pi/3} B_3$$

$K=\frac{N_B}{4}$ use
$$B^1 = B_0 \cup B_2$$

US 7,773,685 B2

TRANSMITTING AND RECEIVING METHODS

FIELD OF THE INVENTION

The present invention relates to a transmitting method, a receiving method, transmitters and receivers, which are in particular but not exclusively, for use in wireless communication systems such as cellular wireless systems.

BACKGROUND OF THE INVENTION

Wireless cellular communication networks and their modes of operation are generally well known. In such a system the area covered by the network is divided into cells. Each cell is provided with a base station, which is arranged to communicate with a plurality of mobile stations or other user equipment in the cell associated with the base station.

In these known systems, a channel is typically allocated to each user. For example, in the case of the GSM (Global System for Mobile communications) standard, a user is allocated a given frequency band and a particular time slot in that frequency band. A single information stream from a single user can be allocated a frequency band and time slot. The so called Third Generation Standards currently being proposed use Code Division Multiple Access (CDMA). In this standard a user is allocated a particular spreading code to define a channel.

A method proposed to improve the capacity of a cellular system is one based on spatial diversity or spatial multiplexing. In this proposed system, the data rate can be increased by transmitting independent information streams from different antennas but using the same channel as defined by frequency, time slot and/or spreading code.

To successfully receive the different information streams, which are transmitted in parallel, it is necessary that the receiving end also have a number of antennas. In practice, for such a system to work, the number of propagation paths for each signal needs to be relatively high, that is, high enough to prevent the channel matrix H, the mathematical representation of the transmitted signal path through space, from being singular. Factors which affect the number of multiple paths, and therefore the transfer matrix, include the communications (radio) environment, the distance between the mobile and base stations and the positioning of the antennas for both the base and mobile stations.

These systems are also referred to as multiple input multiple output (MIMO) systems. These systems require complex controllers to control both the transmission and receiving elements of both the base station and the mobile station. The control circuitry needs to be able to control the antennas, the coding and the modulation of the signal at the transmission side, together with the control of the demodulation, and decoding at the receiving end of the communications link. This is especially complex where the communications equipment differs in capacity between base station to base station and user equipment to user equipment and from time to time.

One of the important factors in controlling a MIMO system is the control of the space-time code blocks or space time modulation system. Conventional modulation techniques such as Amplitude Modulation, Frequency Modulation and Phase modulation, are considered to be modulated at the transmitter with respect to time. The known Space-time modulation systems expand on this concept by creating a code comprising various transmittable symbols which are dependent not only on the time of transmission but also on the position of the individual antenna elements and directions in space formed by the combined use of multiple transmit antennas as they are transmitted.

Prior art space-time coding systems have been proposed. EP-0951091 describes a system generally known as a BLAST (Bell Laboratories layered Space Time architecture) modulation system. In such a system a conventional time modulated code such as Quadrature Phase Shift Keying (QPSK) is used, a group of symbols are created, stored, and each symbol transmitted from each of the transmission antenna in the antenna array. The receiving antenna array then receives and demodulates and decodes the transmitted symbols.

EP-0951091 describes a wireless communication system having a space-time architecture employing multi-element antennas at both the transmitter and receiver. Within this document is disclosed a method for possibly selecting a subset of the antennas to be used for transmission based on feed-back from the receiver. This document though does not address the problem of controlling a MIMO system, where users with different equipment and requirements can co-exist within the same system, and base stations may have different capabilities.

BLAST systems though rely on the number of receiver antenna in the receiver antenna array to be greater than the number of transmit antenna in the transmitter antenna array. Where this is not true the BLAST type modulation system is unable to reach the channel capacity.

SUMMARY OF THE INVENTION

It is an aim of the embodiments of the present invention to address or at least partially mitigate one or more of the problems discussed previously.

There is provided according to the invention a wireless system comprising; a transmitter being arranged to transmit a plurality of beams and a receiver being arranged to receive said plurality of beams; wherein said transmitter is arranged to multiply a stream of symbols to be transmitted by n transforms to generate a resultant transformation used in the generation of said beams; wherein the n transforms used are selected in dependence on at least one of; a wireless radio environment between said transmitter and said receiver, at least one receiver characteristic, and at least one transmitter characteristic.

According to a second aspect of the invention there is provided a method of communication in a system comprising; a transmitter being arranged to transmit a plurality of beams and a receiver being arranged to receive said plurality of beams; comprising the steps of; receiving a stream of symbols to be transmitted; selecting n transforms; and multiplying said stream of symbols to be transmitted by said n transforms to generate a resultant transformation used in the generation of said beams; wherein said selecting step comprises; determining at least one parameter of said transmitter; and/or determining at least one parameter of said receiver; and/or determining at least one parameter of a wireless radio environment between said transmitter and said receiver; and selecting said n transforms in dependence of said determining step.

There is provided according to a further aspect of the invention a wireless system comprising a plurality of transmitters and receivers, wherein each transmitter has between 1 and n antennas and each receiver has between 1 and m antennas wherein one of said transmitter is arranged to transmit to one of the receivers, said one transmitter is controlled in dependence on at least one of: at least one parameter of said transmitter; at least one parameter of said receiver; and at least one parameter of a wireless environment between said transmitter and said receiver. According to a further aspect of the invention there is provided a wireless system comprising a plurality of transmitters and receivers, wherein each transmitter has between 1 and n antennas and each receiver has between 1 and m antennas, wherein one of said transmitters is arranged to transmit to one of the receivers, said one transmitter is controlled in dependence on the number of antennas of the transmitter and the number of antennas of the receiver.

According to a further aspect of the present invention there is provided a wireless system comprising a plurality of transmitters and receivers, wherein each transmitter has between 1 and n antennas and each receiver has between 1 and m antennas, wherein one of said transmitters is arranged to transmit to one of the receivers, wherein the transmission is controlled in dependence on the number of antennas of said transmitter and receiver, based on a scalable space time codes.

According to a further aspect of the invention there is provided a wireless system comprising a plurality of transmitters and receivers, wherein each transmitter has between 1 and n antennas and each receiver has between 1 and m antennas wherein one of said transmitter is arranged to transmit to one of the receivers, wherein the transmission is controlled in dependence on an estimated practical rank number.

According to a further aspect of the invention there is provided a method of communication in a system comprising a plurality of transmitters and receivers, wherein each transmitter has between 1 and n antennas and each receiver has between 1 and m antennas, comprising the steps of: determining at least one parameter of one transmitter; and/or at least one parameter of a receiver to which the transmitter is to transmit; and/or at least one parameter of a wireless environment between said transmitter and said receiver; and controlling said one transmitter to transmit to said receiver in dependence on the at least one determined parameter.

According to a further aspect of the present invention there is provided a method of communication in a wireless system comprising a plurality of transmitters and receivers, wherein each transmitter has between 1 and n antennas and each receiver has between 1 and m antennas, comprising the steps of: determining the number of antennas of one transmitter and the number of antennas of a receiver to which the one transmitter is to transmit; and transmitting from said one transmitter to the receiver in accordance with said determination.

According to a further aspect of the present invention there is provided a method of communication in a wireless system comprising a plurality of transmitters and receivers, wherein each transmitter has between 1 and n antennas and each receiver has between 1 and m antennas, said method comprising the step of: determining a practical rank number for a transmitter and a receiver to which the transmitter is to transmit; transmitting from the transmitter to the receiver in accordance with the determined practical rank number.

According to a further aspect of the invention there is provided a method of communication in a wireless system comprising a plurality of transmitters and receivers, wherein each transmitter has between 1 and n antennas and each receiver has between 1 and m antennas, comprising the steps of: providing scalable space time codes, determining a number of antennas of a transmitter and/or of a receiver to which the transmitter is to transmit; determining space time codes for said transmission in accordance with said antenna determining step; and transmitting to said receiver in accordance with the determined space time codes.

According to a further aspect of the invention there is provided a transmitter for use in a wireless system, said transmitter comprising: a plurality of transmitter elements; means for receiving capability information of a receiver to which said transmitter is to transmit; and means for controlling said transmitter elements in accordance with said receiver capability information.

According to a further aspect of the invention there is provided an entity for use in a wireless communications systems, said entity having means for determining a practical rank number based on information relating to said entity and information relating to an entity with which said entity is arranged to communicate.

Within such a system embodying the present invention the performance in terms of given throughput, with bound conditions set by allowed maximum complexity, may be equal or better than the prior art. Also embodiments of the invention may be scalable so that the communications system can be applied to work for different numbers of transmit and receive antennas and different sizes of modulation alphabets. Embodiments of the invention may be also adaptable to various degrees of antenna correlation, from completely uncorrelated antennas in a rich scattering environment, to a near-completely correlated (line of sight) environment.

BRIEF DESCRIPTION OF DRAWINGS

For a better understanding of the present invention and how the same may be carried into effect, reference will now be made by way of example only to the accompanying drawings in which:

FIG. 8 shows a flow diagram embodying a method for selecting the puncturing scheme embodying the present invention.

DETAILED DESCRIPTION OF EMBODIMENTS OF THE PRESENT INVENTION

Figure 1:
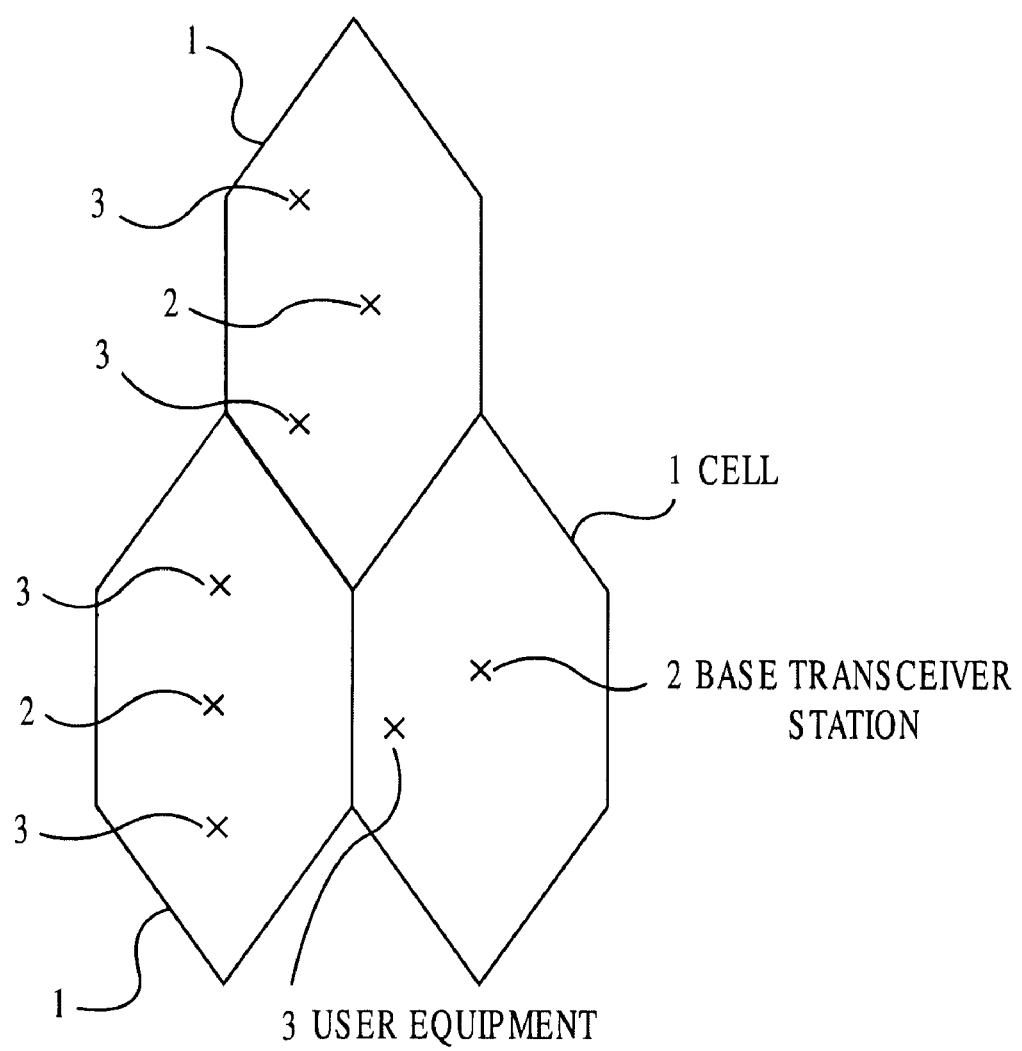
FIG. 1 shows a schematic view of a typical cell layout of a cellular network, in which embodiments of the invention can be implemented.

Reference is made to FIG. 1, which shows part of a cellular telecommunications network in which embodiments of the present invention can be implemented. The area covered by the network is divided into a plurality of cells 1, only three of which are shown in totality with other cells bordering these complete cells. Each cell 1 has associated therewith a base transceiver station 2. The base station transceiver 2 is arranged to communicate with mobile terminals or other user equipment 3 located in the cell associated with a base station. The cells 1 may overlap at least partially or totally. In some systems, the cells 1 may have different shapes to that illustrated. In some embodiments the base stations 2 may communicate with mobile stations 3 outside their associated cell.

Figure 2:
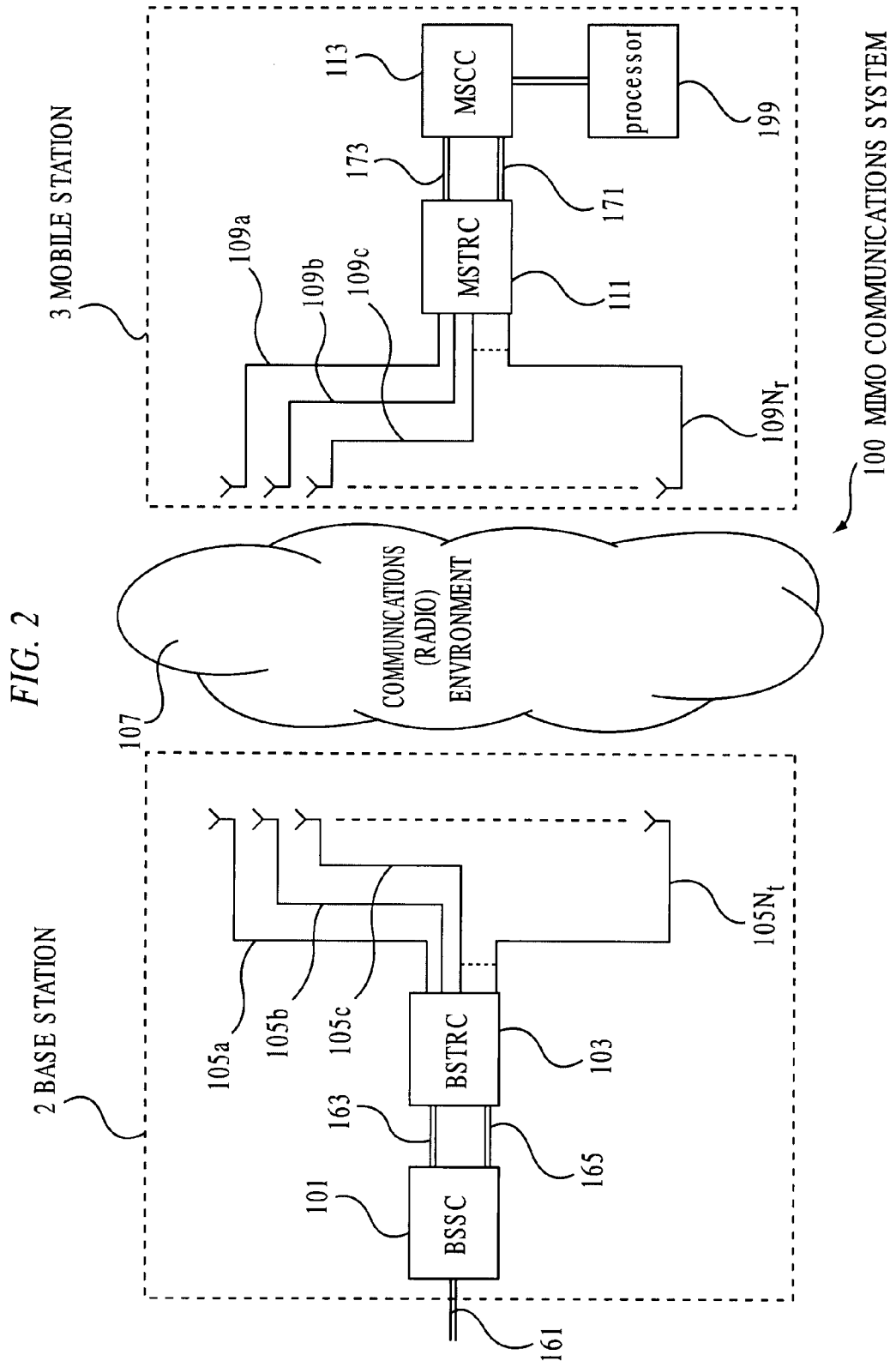
FIG. 2 shows a multiple antenna wireless communication system in which embodiments of the present invention can be implemented.

Reference is now made to FIG. 2 which shows the principles behind a typical multiple input multiple output (MIMO) communications system 100, which may be incorporated into a cellular telecommunications network.

The MIMO communications system 100 can be seen as a plurality of data streams passing in both directions between the base station 2 and the mobile station 3 via the communications environment 107. The communications (radio) environment 107 changes according to several variables, such as time, and the relative base station 2 and mobile station 3 locations. The communications environment 107 may be a rich scattering environment—as found within built up areas where a transmitted signal may take several different paths to reach a receiver. The communications environment 107 at its other extreme may be a largely correlated environment—as typically found where the transmitter and receiver are both within line of sight, and where the signal is usually dominated by a single transmission path.

The base station 2 comprises base station control circuitry (BSCC) 101, base station transmit/receive circuitry (BSTRC) 103, and a base station antenna array (BSAA) 105.

The mobile station 3 comprises a mobile station antenna array (MSAA) 109, mobile station transmit/receive circuitry (MSTRC) 111, mobile station control circuitry (MSCC) 113, and a data source/sink 199.

The base station control circuitry (BSCC) 101 is designed to control the transmit/receive circuitry, and therefore controls such variables as for example the total transmission power, modulation system, coding system, data splitting and individual antenna power. The BSCC 101 is connected to an external data link 161. The external data line 161 is a bi-directional data link which provides and is provided with data. The BSSC 101 is also connected to the base station transmit/receive circuitry 103 via a transmit path 165 and a receive path 163. The transmit path 165 and the receive path may be combined into a single bi-directional path as known in the art. The transmit path 165 and the receive path 163 may pass both data and control information to and from the BSSC 101 and the base station transmit/receive circuitry (BSTRC) 103.

The base station transmit/receive circuitry (BSTRC) 103 performs tasks in dependence on the base station control circuitry, receiving and transmitting data via the base station antenna array 105 and via links to other networks—for example the Public Telecommunications Switched Network (PTSN). The BSTRC 103 is connected via the transmit path 163 and receive path 165 to the BSCC 101. The BSTRC 103 is also connected to the base station antenna array 105.

The base station antenna array (BSAA) comprises a series of $N_t$ antenna elements, or antenna resources, 105$a$-$n_t$ designed to transmit and receive radio frequency modulated signals. These antenna resources may in some embodiments of the invention comprise separate physical elements, or different polarisation transmitters, or a combination of both separate physical elements and different polarisation transmitters. The array is connected to the base station transmit/receive circuitry 103.

The mobile station 3 comprises a similar arrangement as the base station, comprising mobile station control circuitry (MSCC) 113, mobile station transmit/receive circuitry (MSTRC) 111, and a mobile station antenna array (MSAA) 109 comprising $N_r$ antenna elements, or antenna resources, 109$a$-$n_r$. Similar to the base station these antenna resources may in some embodiments of the invention comprise separate physical elements, or different polarisation transmitters, or a combination of both separate physical elements and different polarisation transmitters.

The mobile station control circuitry (MSCC) 113, performs similar tasks to those performed by the base station control circuitry (BSCC) in the base station 2. It is connected to the MSTRC 111 via a pair of transmit 171 and receive 173 paths.

The transmit 171 and receive 173 paths may pass signal data or signal information allowing the MSCC 113 to control such variables as transmission power, modulation system, coding system, data splitting and individual antenna power. The transmit 171 and receive 173 paths may also by replaced by a single bi-directional data link as known in the art.

The MSCC 113 is also connected to a mobile station processor 199 which is both a source and a sink for signal data. This processor 199 may itself comprise digital to analogue converters for speech telephony, video processing elements for visual data, or digital data processors.

The mobile station transmit/receive circuitry (MSTRC) 111 performs tasks in dependence on the mobile station control circuitry 113, receiving and transmitting data via the antenna system 109. The MSTRC 111 is connected to the MSCC 113 via the transmit 171 and receive 173 paths. The MSTRC 111 is also connected to the mobile station antenna array 109.

The mobile station antenna array (MSAA) 109 comprises a number $N_r$ of individual antenna elements, or antenna resources, 109$a$ to 109$n_r$ which can be used to transmit and receive signals at the required radio frequency ranges.

In order to understand embodiments of the invention an example of a message signal transmitted in a known communications system from a base station to a mobile station is described below.

As data is also transmitted from the mobile station 3 to the base station 2 the example detailed below may also be applied to a message transmitted from a mobile station 3 to a base station 2.

The base station transmit/receive circuitry (BSTRC) 103 accepts data to be transmitted, and divides it into a plurality of independently modulatable data streams dependent on control signals from the base station controller circuitry (BSCC) 101. The number of independently modulatable data streams is denoted by K. The K independent data streams are themselves in the form of digital signals and are input to respective sets of conversion circuitry. The base station transmit/receive circuitry (BSTRC) 103 converts the digital signals to the analogue domain and converts the signal from a base band frequency to the appropriate radio frequency. The base station transmit/receive circuitry 103 may also select which antenna element transmits which data stream. In such a system if the number of streams K is less than the number of transmit antenna elements $N_t$, then it is possible to select the K strongest signals received from all of the $N_t$ antenna elements, and these selected antennas used to transmit the K signals.

The up converted signal streams are output to the respective base station antenna array elements, or antenna resources, 105$a$-$n_t$ and are transmitted. Thus the independent signals are transmitted on the same channel at the same time. The channel is defined by the orthogonal transmission resource such as time in Time Division Multiplex (TDM) systems, frequency in Frequency Division Multiplex (FDM) systems and spreading code in Code Division Multiple Access (CDMA) systems.

In practice it should be noted that Time Division Multiplexing is completely orthogonal only in single-path communication channels. In multi-path communication channels, there is the possibility of inter-symbol-interference (ISI) occurring. This happens when the received signal paths differ and therefore symbols transmitted at different times can arrive at the receiver at the same time due to the different time periods between transmission and reception of each pathway.

In communication channels with ISI, Time Division Multiplexing can be made more orthogonal with equalization techniques. Here a series of delay elements are used to constructively add the delayed paths and effectively filter out the interfering multipath elements.

Alternatively the communication channels with ISI may be made more orthogonal using OFDM (orthogonal frequency division multiplexing).

Frequency Division Multiplexing (FDM) is orthogonal only where the velocity of the mobile station with respect to the base station is sufficiently low. As the velocity increases the effect of Doppler shift has to be taken into account. This effect may produce inter-carrier-interference (ICI). Where there is more than a single mobile station using separate carrier frequencies and moving with separate velocities relative to the base station the observed carriers may interfere.

The effects of Inter-carrier-interference and inter-symbol-interference can be mitigated by the use of frequency and/or time guard periods. These guard periods separate the symbols and/or carrier frequencies so that the ISI and ICI effects are minimal.

Code Division Multiple Access (CDMA) systems are orthogonal only if the codes themselves are orthogonal, and if the underlying physical resource (time, frequency) is also orthogonal.

Although in this document the use of orthogonal systems employing orthogonal transmission resources are discussed the use of non-orthogonal resources are also applicable. These non-orthogonal resources may be where, as known in the art non-orthogonal spreading codes are intentionally used.

Alternately the effects of real communication channels as applied to orthogonal resources and therefore creating near-orthogonal communication systems may be considered to be sub-optimal variants of the orthogonal communication systems. These communication system variants may have corrective processes applied to the data streams in order to improve the efficiency of the data streams. Corrective processes such as; equalisation, guard periods and other processes known in the art may therefore be applied to the signal stream.

In order to aid receiving each of the respective channels the base station also sends a training or pilot signal. The training or pilot signal is sent independently of the data stream and is used by the receiver to provide an estimated value for the channel transfer model.

The transmitted signals, both data and training/pilot signals, pass through the radio environment 107 to the mobile station 3. As the signals pass through the environment, the signals may each follow a number of different paths. This is known as multi-path propagation.

The signal is received by the mobile station antenna array (MSAA) 109. The number of mobile station antenna array elements $109a\text{-}n_r$ may be less than, equal to, or greater than the number of base station antenna array elements $105a\text{-}n_r$. Each antenna element receives all of the signals transmitted including the multi path propagations of the signals. The signals received by each antenna element are separately input into the receive arm of the mobile station transmit/receive circuitry (MSTRC) 111. The receive signals input into the receive arm of the mobile station transmit/receive circuitry (MSTRC) 111 are in the analogue domain and at the radio frequency transmitted by the transmitter. The receive arm of the mobile station transmit/receive circuitry 111 as known in the art performs an estimation of the original transmitted signals. The estimated signals are then down-converted and reconverted into the digital domain. The estimated base band digital signals are then recombined to form an estimate of the original message fragment.

Such MIMO systems as known in the art whilst having some control on which antennas transmit the K streams, do not have the flexibility to deal with a range of different communication links which comprise users with devices spanning a variety of hardware, software, and user requirements, with different correlation between antenna elements, and over a rapidly changing communications environment.

Figure 3:
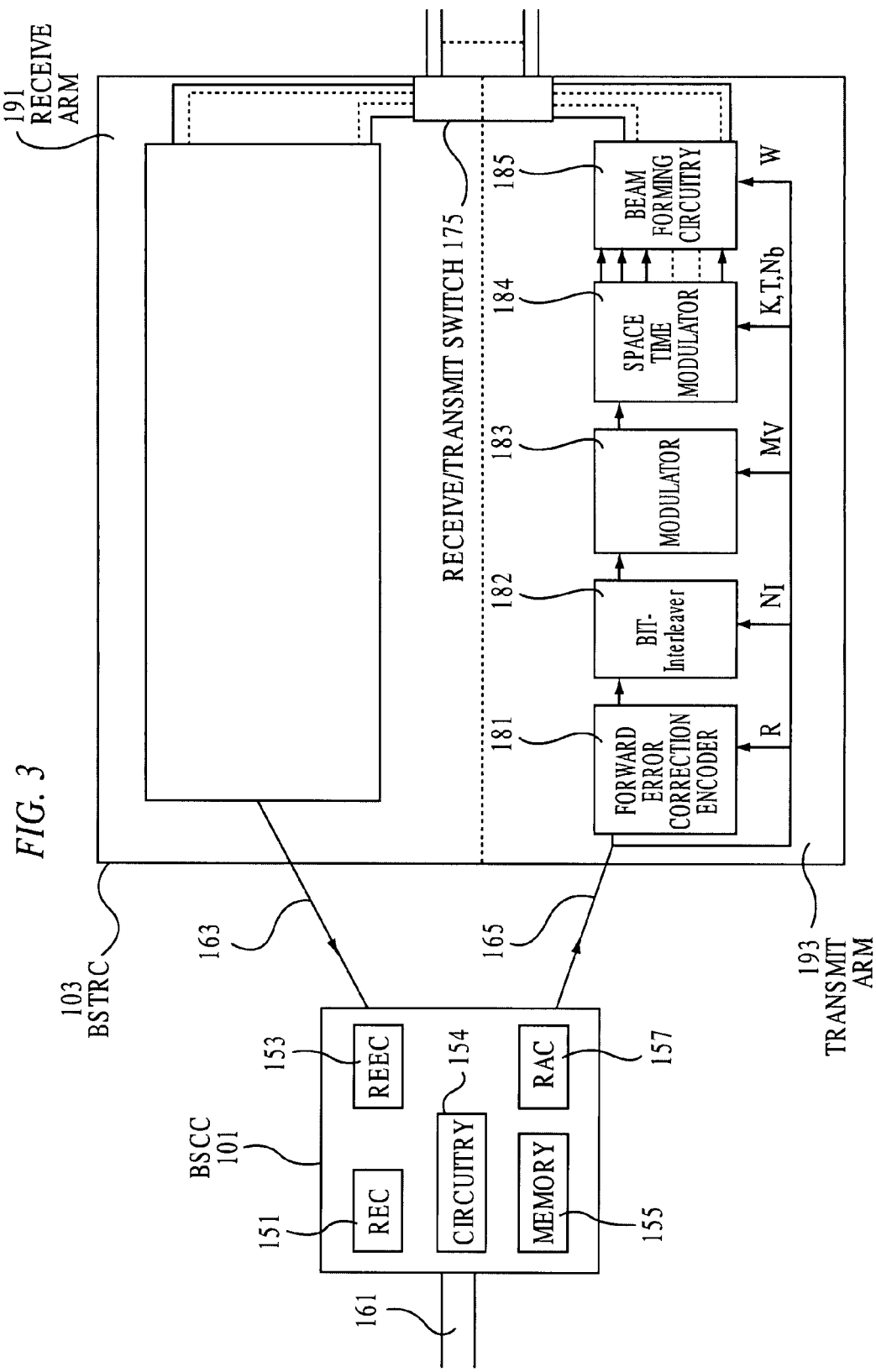
FIG. 3 shows base station control circuitry and base station transmit/receive circuitry embodying the present invention.

FIG. 3, shows the structure of the base station control circuitry (BSCC) 101 and base station transmit/receive circuitry (BSTRC) 103 incorporating an embodiment of the present invention. The base station control circuitry (BSCC) 101 further comprises; Resource Estimation circuitry (REC) 151, Practical Rank Estimation circuitry (REEC) 153, Resource Allocation circuitry (RAC) 157, some memory or data storage device 155 and transformation matrix W generation and applying circuitry 154.

The base station transmit/receiver circuitry (BSTRC) 103 further comprises a transmit arm 193 and a receive arm 191 and a transmit/receive switch 175. The transmit arm comprises a Forward Error Correction encoder 181, a bit-interleaver 182, a modulator 183, and a space time modulator 184, and beam forming circuitry 185.

The transmit arm of the base station transmit/receiver circuitry (BSTRC) 103 receives data and control signals from the transmit path 165 connecting the base station control circuitry 101 to the base station transmit/receive circuitry 103. The data part 165a and control part 165b of the received signals are separated inside the BSTRC 103.

The Forward Error Correction (FEC) encoder 181 comprises a data input connected to the data part 165a of the transmit path 165, a second control input R connected to the control part 165b of the transmit path, and a data output connected to the data input of the bit interleaver 182.

The bit-interleaver 182, comprises a data input connected to the data output of the Forward Error Correction encoder 181, a control input $N_I$ connected to the control part 165b of the transmit path, and a data output connected to the data input of the modulator 183.

The modulator 183, comprises a data input connected to the data output of the bit-interleaver 182, a control input $M_v$ connected to the control part 165b of the transmit path, and a data output connected to the data input of the space-time modulator 184.

The space-time modulator 184, comprises a data input connected to the data output of the modulator 183, a plurality of control inputs $K, T, N_b$ connected to the control part 165b of the transmit path, and a plurality of data outputs connected to the inputs of the beam forming circuitry 185.

The beam forming circuitry 185, comprises a plurality of data inputs connected to the outputs of the space-time modulator, a control input W connected to the control part 165b of the transmit path, and a plurality of data outputs connected to one of the inputs of the transmit/receive switch 175.

The transmit/receive switch 175, has three sets of terminals. One set of terminals is connected to the antenna array 105. A second set of terminals is connected to the data outputs from the beam forming circuitry 185. The third set of terminals is connected to the input of the receive arm 191.

In order to control the transmit arm 193 of the transmit/receive circuitry 103 the controller circuitry is described below.

The Resource Estimation circuitry (REC) 151 comprises circuitry with the ability to estimate the resources available, whether these are time slots (for Time Division Multiplex systems), Frequency slots (for Frequency Division Multiplex systems), or codes (for Code Division Multiple Access systems). The results of which are passed to the Resource Allocation circuitry 157.

The Practical Rank Number (PRN) estimator circuitry 154 comprises circuitry with the ability to estimate the Practical Rank Number for a user whenever the Practical Rank Number is requested.

To understand the workings of the Practical Rank Number estimator circuitry 154, it is necessary to define the meaning of the Practical Rank Number. With reference again to FIG. 2, it can be seen that the base station in this embodiment comprises an antenna system comprising $N_t$ antenna elements, whilst the mobile station comprises an antenna system comprising $N_r$ elements.

Taking a simple example whereby each of the base station antenna array 105 elements transmits an independent stream of symbols $x_k$—where k is the k'th transmitted stream and also the k'th antenna element. The symbols pass via the radio environment 107 and are received by the mobile station antenna array 109 elements, each outputting the value $y_k$, with k indicating the $k^{th}$ receiving antenna element.

Each of these antennas can be considered to have received a linear combination of each of the transmitted symbol streams multiplied by a channel coefficient plus an additional noise element. These linear combinations when fed into the receive circuitry are capable of being operated on in order to reconstruct the original independent streams transmitted by the transmit antenna array 105. Accurate reconstruction of the original data stream depends on having at least as many receive antennas as transmitted data streams. If each transmission antenna element carries a different transmitted data stream then the number of transmit antenna elements has to be smaller than or equal to the number of receive antenna elements in order to be able to reconstruct the original message. The relationship between the receive and the transmit endpoints can be shown mathematically by equation (1).

$$Y=HX+N \quad (1)$$

Equation (1) shows the matrix equation for the communication channel, where $Y=\{y_1, y_2, y_3, \ldots, y_{Nr}\}^T$ is the vector of the received values from 1 to $N_r$, $X=\{x_1, x_2, x_3, \ldots, x_{Nt}\}^T$ the vector of the transmitted values from 1 to $n_t$, $N=\{n_1, n_2, n_3 \ldots n_{Nr}\}^T$ is the vector of the received intrinsic noise from 1 to $N_r$, and H is the channel transfer function. In single-path channels based on time-division multiplexing (TDM), or in multi-path channels with orthogonal frequency-division multiplexing (OFDM) and with a sufficient guard band (cyclic prefix), the channel transfer function may be expressed in terms of a channel transfer matrix of channel coefficients. As it is well known in the art the rank of the transfer function H determines the maximum number of signals that can accurately be reconstructed. The rank of the transfer function H has at its largest value the smallest of the two numbers, representing either the number of transmitting antennas $N_t$ or receiving antennas $N_r$. This value may not be an accurate value for the practical number of maximum signals that can be transmitted.

A second practical method for determining the rank of the channel transfer matrix H as known in the art is to transmit a known pilot or training signal from the transmitter, receive said signal and perform singular value or eigenanalysis upon the received signals.

Singular value or eigenanalysis are known mathematical tools which can be used to analyse a multiple input/output system to determine the relationships between the inputs and the outputs. From such an analysis it is possible to retrieve singular or eigenvalues. The singular or eigenvalues determine the modes of the system—in other words how many independent effective channels exist, and their relative strengths.

Each of these independent effective channels can be used to transmit one of the parallel data streams. As is known in the art, the rank of a channel transfer matrix can be measured either by determining the number of singular values from the channel transfer matrix not equal to zero or similarly the number of eigenvalues of the channel transfer matrix not equal to zero.

The singular values are singular values of H, the eigenvalues are eigenvalues of the matrix $H^H H$, which are squares of the singular values of H. Thus the singular and eigenanalysis methods produce similar results.

As the received signal also contains noise, which contains a random fluctuating component, the estimated rank of the channel transfer matrix may differ from the actual rank, i.e. the noise may modulate the actual singular value determinant values or eigenvalues creating more non-zero values. Therefore measured rank may not be the appropriate maximum number of parallel channels possible of being transmitted.

Also, in addition to the measurement of the radio environment to determine the optimal number of independent streams capable of being passed to the user there are other constraints to using the rank value.

Depending on the type of subscription of the user, and channel conditions of other users, the base station may decide to drop some weakest singular/eigenvalues of a user, and correspondingly to restrict the data rate served to this user, in order to minimize interference to other users.

In this case the rank value determined by either the bound or the first eigenvalue/singular value estimate may produce incorrect estimates for the optimal number of independent data streams.

In order to overcome these disadvantages, embodiments use a practical rank number (PRN) estimation generated by the practical rank number generation circuitry 153. The practical rank number is defined as the number of singular values that are above a defined threshold value.

Embodiments of the present invention allow the threshold value used within the practical rank number generator 153 to be either a relative or an absolute threshold. The relative practical rank number (rPRN) value may be defined as a constant $(a_r)$ times the average value of all of the singular values. The absolute value practical rank number (aPRN) is instead defined as a constant $(a_a)$ times a estimated Signal to Interference Noise ratio (SINR) value. The estimated Signal to Interference Noise ratio can be determined by a pilot or training signal.

The Practical Rank Number (PRN) thresholds can be selected by an operator on a cell by cell basis and based on either forecasted information or measured interference levels or traffic statistics. Within a cell, different users may have different thresholds, based on e.g. the type of subscription, and the equipment the user makes the communications link with.

The channel Practical Rank Number can be measured from down-link or up-link signal, by either a closed or open loop measuring system.

Figure 4A:
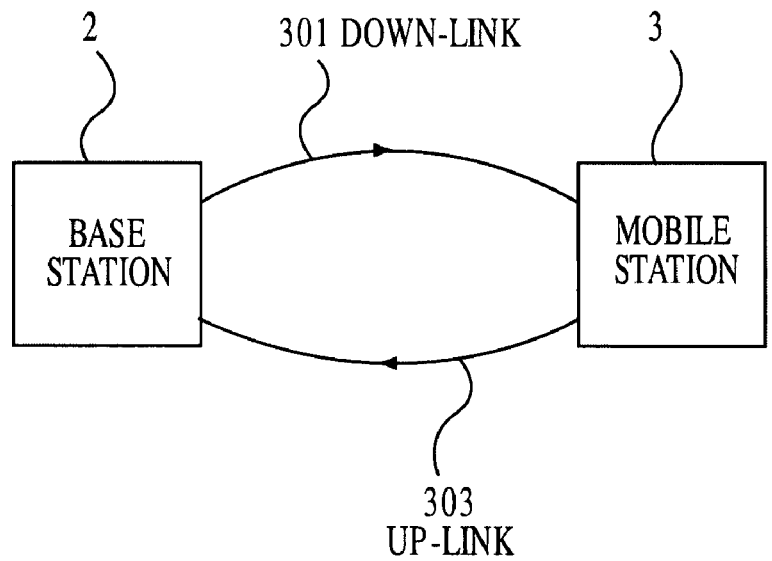
FIG. 4 shows a block diagram detailing the open and closed loop measurement systems used in embodiments of the present invention.

With reference to FIG. 4a, the closed loop measurement system comprises the steps of transmitting a pilot or training signal from the base station 2 to the mobile station 3 via the down-link 301. The pilot or training signal is analysed and the PRN information transmitted back to the base-station 2 via the up-link 303.

Figure 4B:
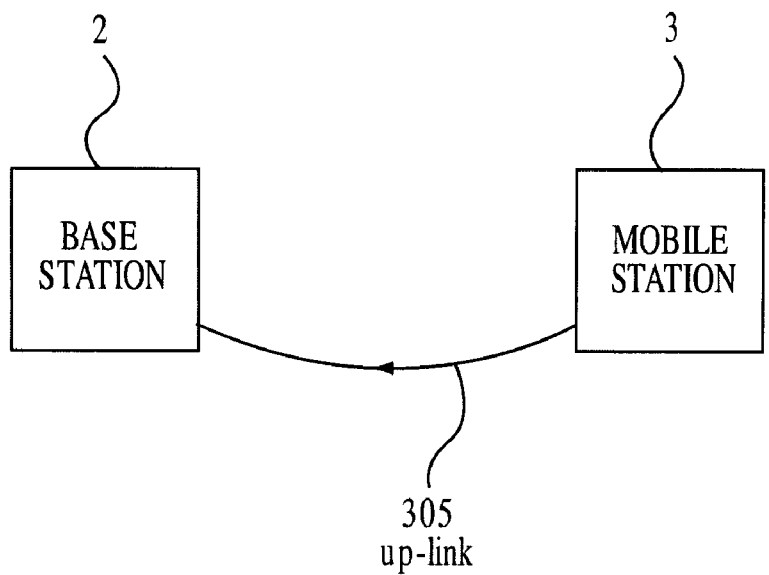

Another embodiment, the open loop measurement system, can be seen with reference to FIG. 4b. Here the base station 2 estimates the down-link practical rank number from measuring an up-link practical rank number. This embodiment relies on the approximate equivalency of the uplink and downlink channels. This can be held to be fairly accurate as can be seen within time division duplexing where the uplink channel and downlink channels are slightly delayed versions of each other, and therefore only susceptible to fast fading. The same degree of accuracy for estimating the PRN is also true in typical frequency division duplexing systems. Where the up-link and down-link frequencies are close to each other, the large scale structures of the up and down-link transfer matrices, and particularly the practical rank number, can be almost the same.

The Resource Allocation Circuitry (RAC) 157 comprises circuitry with the ability to accept data from a variety of sources both within and outside of the controller. This data may include data from the PRN estimation circuitry 153, and Resource estimation circuitry 151. The RAC then outputs control signals to the base station transmit/receive circuitry (BSTRC) 103 to each user in dependence of data inputs.

In other words the RAC 157 controls the Base Station Transmit/Receive circuitry (BSTRC) 103 by allocating such resources as Time slots, Frequency slots, codes, and antenna elements.

In the embodiment shown in FIG. 3, data passed to the transmit arm of the Base station transmit/receive circuitry 103 to be transmitted is passed through a Forward Error Correction (FEC) encoder 181. Forward error encoding is carried out on data to attempt to mitigate the errors created by noise, so that when the data signal is received it is possible to extract the code and detect and correct for any errors in the signal. The FEC encoder 181 is controlled by a control signal R representing the information rate of the encoder, and may provide any suitable scheme known in prior art, including turbo, convolutional, block, trellis, and low-density parity check coding.

The data to be transmitted may also be interleaved in a bit interleaver 182. Bit interleaving may be carried out to mitigate the effect of a particular type of noise known as burst noise. Burst noise will in a normal signal cause blocks of errors for which FEC encoding is unable to compensate for. Bit interleaving splits a data stream so that the bit stream is shuffled in a known way. If a burst error now occurs during transmission, the errors in the de-shuffled received stream no longer occur in a single block as the interleaved bits are de-interleaved—and the error density is low enough for the FEC encoding to correct for the errors. A simple bit-interleaver is characterized by the number $N_i$ of bits in an interleaving block.

The coded and interleaved bits are converted into complex value modulation symbols in the modulator 183. The modulator takes the output bits of the interleaver, and encodes them into complex value modulation symbols. Each of these symbols encode $M_v$ bits into a complex value number symbol which has a constellation of a possible number of values equal to the number $2^{\wedge}M_v$ (two to the power of $M_v$).

A control signal controls the modulator. The control symbol is capable of changing the value of $M_v$ and/or capable of changing the modulator constellation. Therefore in embodiments of the invention modulation constellations may be changed for each symbol. In embodiments of the invention modulation constellations as known in the art may be applied.

Examples of modulation constellations are M level Quadrature Amplitude Modulation (M-QAM), Quadrature Phase Shift Keying (QPSK), Differential QPSK.

The modulation symbols are prepared for transmission over spatial and orthogonal transmission resources in the space-time modulator 184. The space-time modulator 184 prepares the K parallel streams for transmission over $N_b$ transmission beams and over T orthogonal transmission resources. The space-time modulator divides the sequence of incoming symbols into sets of KT symbols, which constitute the K parallel streams over T orthogonal transmission resources (where an orthogonal transmission resource can be for example time slots in a TDM system, frequency sub-carriers in a FDM system, and spreading codes in a CDMA system). K is defined as the average number of different complex modulation symbols transmitted per used orthogonal transmission resource.

The complex value symbols in each of these sets may be denoted by $Z_k$, where k=1, ..., KT, and are collectively denoted by the vector $Z=[Z_1, Z_2, \ldots, Z_{KT}]$. The space-time modulator output in the T=1 case is the vector Z.

In a typical cellular communications environment the orthogonal transmission resources are divided into a number of separate slots.

In the conventional system of coding T=1, each slot is handled separately. Therefore the space-time modulator would treat one transmission resource at a time. An example of such a system can be found in such communications systems as GSM and GPRS where the use of more than a single transmission resource such as a frequency channel is handled and coded separately.

Where the number of slots simultaneously by the space-time coder is greater than one, T>1, more than one orthogonal transmission resource is therefore used. The parameter T determines how many slots the space-time modulator extends over, i.e. treats simultaneously. For T=2, the space-time modulator takes the sequence of orthogonal resources, divides these resources into pairs, and treats one pair simultaneously.

The treatment of these slots by the space-time modulator is described below. Although the description is addressed to the orthogonal resource of time slots it can also be applied to other orthogonal resources such as frequency slots or spreading codes.

Where the orthogonal resource is based on time slots, the space-time modulator output for T>1 may construct the K parallel streams by applying space-time codes.

For the example where the space-time code deals with more than one orthogonal resource simultaneously, in other words the T>1 case the space-time modulator 184 constructs a $T \times N_b$ dimensional matrix C, which prepares the K parallel streams for transmission over $N_b$ spatial transmission resources (beams, antennas, polarizations), and T substantially orthogonal transmission resources (time slots, frequency subcarriers, spreading codes).

In other words embodiments of the present invention use matrix C to prepare the transmission for transmission over $N_b$ beams. These beams being constructed from $N_t$ transmission resources (or $N_b$ beams are created using the $N_t$ antenna resources in the base station antenna array) by the beamforming circuitry.

The simplest of the usable Space Time codes, or Space Time Transmit Diversity (STTD) codes can be represented where T=2, K=1 and $N_b$=2, or in other words the transmission of two independent symbols over two orthogonal transmission resources, using two beams. The number of streams, or the symbol rate, is K=1. That is, two different (complex modulation) symbols are transmitted during two transmission resources.

Due to the nature of the transmission media the orthogonal transmission resource spectra are likely to be divided into many parts. Embodiments of the present invention may use neighbouring resources in the same code block, e.g. in a TDM resourced system the first block is transmitted in the first time slot, and the second block of symbols transmitted in the second time slot. Further embodiments of the present invention may use non-neighbouring resources, e.g. in a similar TDM resourced system the first block is transmitted in the first time slot and the second block transmitted somewhere other than the second or the last time slot in the TDM cycle.

The Space Time Transmission Diversity (STTD) code, also known as the Alamouti code, representing this situation can be seen in a simple 2×2 array as shown in equation 2:

$$C = \begin{bmatrix} S_1 & S_2 \\ -S_2^* & S_1^* \end{bmatrix} \quad (2)$$

For example where $S_1$ and $S_2$ are the first and second set of symbols being transmitted in a TDM system, the above matrix C can be interpreted as a single stream of data. In this single stream the symbol rate is one symbol per transmission resource. In other words $S_1$ and $S_2$ are transmitted over a first orthogonal resource, in this example a time period using a first and second beams $N_{b1}$ and $N_{b2}$, created from the transmitter array $N_t$. Whereas the symbols $S_1^*$ and $-S_2^*$, the complex conjugate and negative complex conjugate of the symbols $S_1$ and $S_2$ respectively, are transmitted over a second orthogonal resource, in this case a second time period, using the second and first beams $N_{b2}$ and $N_{b1}$ respectively.

This can be applied to other orthogonal or near-orthogonal transmission resources such as frequency slots in FDM systems, code slots in CDMA systems.

As is known in the art it is possible to perform code overlapping, folding, or concatenation, by adding a second 2×2 block to the first as represented by equation (3). This is a symbol stuffing exercise, with the idea to increase the symbol (data) rate. The advantages of the form provided by equation (3) below combined with equation (4) (also below) is that it provides an advantageous way to double the data-rate. Thus two complex symbols per transmission resource are transmitted, compared to transmitting only one complex symbol per transmission resource with equation (2). This advantage is only true where there are at least two receive antennas are available. Also it is required that the receive antennas are not correlated to the degree where decoding the new code is not possible. Finally the advantage holds where the modulation is QPSK or M-QAM. The use of this space time code may produce better performance in terms of bit-error rates.

$$C_2(\vec{s}_{1\text{-}4}) = \begin{bmatrix} S_1 & S_2 \\ -S_2^* & S_1^* \end{bmatrix} + U \begin{bmatrix} S_3 & S_4 \\ S_4^* & -S_3^* \end{bmatrix} \quad (3)$$

Where the matrix U is a unitary 2×2 matrix with determinant 1, chosen to perform a complex diversity transform (CDT) in order to mitigate the self-interference induced by transmitting overlapping STTD blocks.

An example similar to that defined for the C matrix single stream above can be applied to the matrix $C_2$. Similar to the C matrix, the $C_2$ code uses two beams with two orthogonal transmission resources, in other words T=2, $N_b$=2. These two beams require at least two antenna resources in other words $N_r$>=2.

Unlike the C matrix it is the addition of the second symbol block containing the complex diversity transformed symbols $S_3$ and $S_4$ which enables the whole $C_2$ to be considered as having a rate twice that of the C block i.e. K=2. Another way of considering this is that the code block encodes two parallel streams and transmits these using the same resources, both orthogonal and beams as the C matrix block. The symbols $S_3$ and $S_4$ may be considered as symbols from the second stream, and $S_3^*$ and $S_4^*$ being their complex conjugates.

Advantageously, all elements of the matrix U should be non-vanishing, and embodiments of the invention may use a complex diversity transform (CDT) matrix as defined in equation (4).

$$U = \frac{1}{\sqrt{7}} \begin{bmatrix} 1+2j & 1+j \\ -1+j & 1-2j \end{bmatrix} \quad (4)$$

Within an embodiment of the invention, the modulation and coding schemes are chosen so as to reuse codes. In other words embodiments of the present invention may use schemes for transmission to 2, 4, 8, or 16 antennas as defined by equations (3), (5), (6), and (7) respectively.

$$C_4(\vec{s}_{1\text{-}8}) = [C_2(\vec{s}_{1\text{-}4}) \; C_2(\vec{s}_{5\text{-}8})] \quad (5)$$

$$C_8(\vec{s}_{1\text{-}16}) = [C_4(\vec{s}_{1\text{-}8}) \; C_4(\vec{s}_{9\text{-}16})] \quad (6)$$

$$C_{16}(\vec{s}_{1\text{-}32}) = [C_8(\vec{s}_{1\text{-}16}) \; C_8(\vec{s}_{17\text{-}32})] \quad (7)$$

It is possible from the above to construct similar scalable systems for any even number of transmit beams $N_b$. All the codes shown above in equations (3), (5), (6), and (7) are based on the use of two orthogonal transmission resources i.e. T=2 and therefore have two rows. The code block shown in equation (5), constructed from two $C_2$ blocks, $C_4$, uses four separate beams $N_b$=4 and therefore $C_4$ has four columns. The code block defined by $C_4$ can also be considered to encode at a rate four times that of the original C matrix, i.e. K=4 or encoding four parallel streams or four complex symbols per orthogonal transmission resource.

The code block shown in equation (6), constructed by two $C_4$ blocks, $C_8$ uses eight separate beams (and therefore has eight columns) $N_b$=8 and therefore requires the transmitter to have at least eight separate antenna resources available $N_r$>=8. The $C_8$ block can be considered to encode symbols at a rate eight times that of the original C matrix, i.e. K=8. This may also be considered to be the equivalent to encoding eight parallel streams or eight complex symbols per orthogonal transmission resource.

The code block shown in equation (7), constructed by two $C_8$ blocks, $C_{16}$ uses sixteen separate beams (and therefore has eight columns) $N_b$=16 and requires the transmitter to have at least sixteen separate antenna resources available $N_r$>=16. The $C_{16}$ block can be considered to encode at a rate 16 times the original C matrix, i.e. K=16. This may also be considered to be the equivalent to encoding sixteen parallel streams or sixteen complex symbols per transmission resource.

The selection of these space time codes and others further described and featured in embodiments of the invention is made based on the control signals K, T and $N_b$.

The scalable T=2 code sets as described above do not account for the number of receive antennas $N_r$ in the space-time modulation scheme.

If the number of receive antennas $N_r>1$, and the coefficients of the channel matrix are independent and identically distributed, it can be shown that the information capacity of the channel can be reached only by sending $K=N_t$ independent complex symbols per used physical transmission resource. In other words the rate of transmission (or the number of streams) K at capacity is equal to the number of antenna resources $N_t$.

However, using equation (1), it is possible to see that in order that a system is capable of being demodulated and decoded the maximum number of streams K is equal to, or less than the maximum number of linear independent equations in equation (1). In other words K=<min(N,M). In practical systems where the channels are neither independent nor identical the inequality is instead the number of streams less than or equal to the practical rank number (PRN) K=<PRN=<min(N,M). In such a case where the practical rank number (PRN) is less than the number of transmitters (PRN<N) the above code schemes carry a heavy performance penalty as the receiver diversity is not sufficient to separate the received signal into the streams.

Therefore in embodiments of the present invention space-time codes are produced and used to advantageously encode the modulated symbols in order to allow greater efficiencies in channel capacity to be exploited, while also allowing the created codes to be simply detected at the receiver.

In embodiments of the invention extra diversity is created within the space-time modulator 184. Where it is determined by the controller circuitry 101 that the number of transmit antenna resources $N_t$ is greater than the receive diversity, as indicated by the practical rank number, the space-time modulator 184 performs a series of actions to create a punctured space-time modulation scheme. A punctured space-time code uses elements in the scheme, which contain no additional information, for the creation of additional diversity.

In embodiments of the invention the space-time code basis matrices are selected according a series of criteria.

The beam-forming circuitry 185 receives the beam transmission signals from the space-time modulator 184 and constructs the $N_b$ beams from $N_t$ antenna resources (as described above, this in some embodiments is the number of antennas or the number of different polarizations capable of being broadcast or a combination of the both in the base station antenna array). In order to transmit the number of antenna resources should be equal to or greater than the number of beams to be transmitted $N_t>=N_b$. The action of the beam-forming circuit 185 may be described in terms of a transformation matrix W with dimensions $N_b \times N_t$ as seen in equation (8).

$$X_{N_t} = W X_{N_b} \qquad (8)$$

Whereby the $X_{Nt}$ vector is the transmitted resource, the $X_{Nb}$ the output of the space-time modulator.

If $N_t=N_b$, and W is the identity matrix, no beamforming is performed. Otherwise, the beams formed by the transformation may be trivial, pseudorandom, or based on long or short term side information.

The simplest beam-forming circuit selects $N_b$ antennas out of $N_t$ possible antenna resources. It is preferable to select the $N_b$ antennas that are physically as far from each other as possible. This beam-forming circuit output is known as trivial beam forming. The beams formed are constant from time slot to time slot (or from one substantially orthogonal transmission resource to another). Therefore the transformation matrix W is constant with respect to the time slot (or to the orthogonal resource used).

Pseudorandom beams differ from trivial beams as the beams may differ from one orthogonal resource to another. Advantageously, the pattern of change of the pseudorandom beams is known to the receiver.

Pseudorandomization may be advantageously employed where the number of antenna resources $N_t$ is greater than or equal to the number of beams $N_b$ required. The beam-forming circuitry adds additional transmit diversity into a message by pseudorandomization. Transmit diversity is an attempt to force the same message to reach the receiver via more than one path. In using more than a single path the message is protected against sudden fading conditions in one path. Typical transmit diversity occurs in broadcasting one signal in more than one direction, at more than one frequency or time slot or with more than one polarisation. Pseudorandomization as employed is a method of doing this in using the unused transmit resources.

If the number of transmit antenna resources $N_t$ is larger than the number of antenna resources used by the space-time modulator to create the space time code block $N_b$, the extra transmit antenna resources may be used to construct pseudo-randomized beams as defined by equation (9).

$$X_e = \frac{1}{\sqrt{2}}(X_a + w_b(t)X_b) \qquad (9)$$

Where $X_e$ is the pseudorandomized beam, $X_a$ and $X_b$ are the channel vectors (data streams) related to two transmit antennas and w(t) is a complex weight factor which may change in time, or from orthogonal transmission resource to orthogonal transmission resource, possibly in a pseudo random fashion.

Embodiments of the invention may use complex weight factor which features a phase factor which changes continuously (in other words performs a phase sweep) or discretely (performs phase hopping). Also according to embodiments of the invention the sequence w(t) may be predefined, pseudo random or truly random.

In this embodiment, the beam-forming matrix W has $N_b$ rows with $N_t$ elements. In each column of the transformation matrix W there would be one non-zero element. In $N_t$-$N_b$ of the rows of the transformation matrix W there would be two non-zero elements. According to equation (9), one of the row's non-zero elements would be $$\frac{1}{\sqrt{2}},$$

the row's other non-zero element would be $$\frac{1}{\sqrt{2}} w_b(t).$$

If $N_t>2N_b$, each row of the Transfer matrix W would have at least two non-zero elements, and some rows of the Transfer matrix W would have more than two non-zero elements. Also the complex weight factor $w_b$ may be different for different antenna array elements.

A further advantage of randomising the extra transmit capacity is to make the communications channel more ergodic. The ergodicity of a system is defined as the measure of the accuracy over time that a series of sampled values over a short time period represents statistical values for the system (such as the mean value). This is true in the case of randomizing as the added channels sample all channel states at a much faster and even rate than the slow fading produced by the physical channel fading. Thus randomized channels act as an extra interleaver.

In order not to compromise channel estimation, it is beneficial that the mobile station is capable of estimating the slowly fading constituent channels $X_a$ and $X_b$ separately. The estimation of the slow fading channels $X_a$ and $X_b$ may be arranged by transmitting orthogonal pilot or training sequences on the channels $X_a$ and $X_b$. The training or pilot sequences may be the same as each other or dedicated to each channel. The training or pilot sequence is preferably not transmitted over the random changing additional beam. In such a situation, the mobile station (the receiving station) should know the sequence w(t) used.

Randomizing may also be used if $N_b=N_t$. In randomizing embodiments entries in the beamforming transformation matrix W may be diagonal, with some entries being complex weight factors $w_b(t)$.

In all randomising embodiments, the complex weight factors are held substantially constant during the temporal extent T of the output of the space-time modulator 184 (or held substantially constant for the other orthogonal resource).

Embodiments of the beamforming circuitry 185 may also be arranged such that the beamforming circuitry selects antennas transmitting parts of the same $C_2$ block (the space-time transmit diversity code block) to be close to each other, as these antennas have the strongest correlation between them.

Further, embodiments may be arranged to enlarge the code block $C_2$ by a pseudo-random beam-forming matrix W to any number $N_t > N_b$ transmit antennas.

The beamforming circuitry 185 may also be used to steer the beams, based on channel information at the transmitter. This information may be based either on measurements at the transmitter or feedback information from the receiver to the transmitter. The feedback information may pertain to the short-term (instantaneous) structure of the channel, or to the long-term (stationary) structure.

The beamforming circuitry 185 may carry out any of the above embodiments dependent on the control signal W.

The output of the beamforming circuitry 185 is then passed to the receive/transmit switch 175. The receive/transmit switch 175 directs the outputs of the beamforming circuitry to the antenna array 105. The receive/transmit switch 175 may also comprise a series of radio-frequency power amplifier stages which amplify the output of the signals from the beamforming circuitry 185 prior to being broadcast by the antenna array 105.

Therefore in summary the information bits to be transmitted are first passed through the forward error coder 181, the bit interleaver 182 and the modulator circuit 183. The output of which produces a stream of complex modulation symbols z.

The symbols are passed through a space-time modulator 184, which takes sequences of KT symbols and maps them to a $T \times N_b$ matrix C, preparing the symbols for transmission over T substantially orthogonal transmission resources (time, frequency, spreading codes) and $N_b$ beams.

The output of the space-time modulator is passed to the beam-forming circuit. This constructs $N_b$ beams from $N_t$ transmission resources (antennas, polarizations).

Finally the signals to be transmitted are up-converted to the radio-frequency and transmitted.

The full signal model for the MIMO system can be represented by equation (10).

$$\underset{T \times N_r}{R} = \underset{T \times N_b}{C} \underset{N_b \times N_t}{W} \underset{N_t \times N_r}{H} + \underset{T \times N_r}{N_i} \quad (10)$$

In this embodiment of the invention T is the temporal event representing the orthogonal resource, $N_b$ the number of transmission beams, $N_t$ the number of transmit antennas resources, $N_r$ the number of receive antenna resources, R the matrix of the received signals with a dimension of $T \times N_r$, C is the space-time code matrix with a dimension of $T \times N_b$, and W is the beam-forming matrix with a dimension of $N_b \times N_t$.

In order to simplify the use of the complex modulation symbols, the KT complex symbols can be considered to be 2KT real modulation symbols. In other words each of the KT complex symbols can be seen as comprising a real and an imaginary part. Modulation systems such as QPSK and M-block Quadrature Amplitude Modulation (M-QAM) can be easily decomposed into real and imaginary parts. The real and imaginary parts of KT complex symbols can thus be considered to be 2KT real symbols, denoted by $x_i$ where i=1 to 2KT. The connection of the real and complex symbols can be expressed as $S_i = x_i + x_{KT+i} j$. Where $S_i$ is the i'th complex symbol, $x_i$ the real symbol representing the real part of the i'th complex symbol, and $x_{KT+i}$ representing the imaginary part of the i'th complex symbol. In such a way a linear MIMO modulation scheme can be expressed according to equation (11).

$$C = \sum_{k=1}^{k=2KT} x_k \beta_k \quad (11)$$

In this representation $x_k$ are the 2KT real symbols, C the space-time coding matrix with dimensions $T \times N_b$, and $$\{\beta_k\}_{k=1}^{k=2KT}$$

is a set with 2KT elements, each $\beta_k$ being a matrix with constant and complex elements of dimensions $T \times N_b$. Each of these coefficient matrices is used to encode a real symbol. The complete set $$\{\beta_k\}_{k=1}^{k=2KT}$$

being called the basis of the space-time modulation.

Embodiments of the present invention produce, and use these basis matrices to generate the elements of the space-time modulation matrix C as shown in equation (11).

Some basis sets of coefficient matrices are known.

The first of these known basis sets is the Weyl basis. The codes are constructed from two matrices with dimensions of $N_b \times N_b$.

$$D = \begin{bmatrix} 1 & 0 & \cdots & 0 \\ 0 & e^{j2\pi/(N_b)} & 0 & \cdots \\ \vdots & & \ddots & \\ 0 & \cdots & & e^{j2(N_b-1)\pi/(N_b)} \end{bmatrix}, \Pi = \begin{bmatrix} 0 & 1 & 0 & 0 & \cdots & 0 \\ 0 & 0 & 1 & 0 & \cdots & 0 \\ 0 & 0 & 0 & 1 & \ddots & \vdots \\ \vdots & \vdots & \vdots & \ddots & \ddots & 0 \\ 0 & 0 & 0 & \cdots & 0 & 1 \\ 1 & 0 & 0 & \cdots & 0 & 0 \end{bmatrix} \quad (12)$$

The first matrix, the D matrix, comprises a sparse matrix with a series of complex numbers along its diagonal elements. These diagonal element values are equally spaced around the circle defined in the complex plane by the exponential form $e^{j\Theta}$. The second matrix $\Pi$ is formed by the identity matrix of size $N_b$, wherein the first row of the identity matrix is moved to form the last row of the $\Pi$ matrix. In order to form the Weyl basis matrices the two matrices D and $\Pi$ are combined to form the code matrices of size $N_b \times N_b$, where $N_b$ is equal to K and T, using equation (13).

$$\beta_{kl}^W = D^{k-1} \Pi^{l-1}, \text{ for } k = 1, \ldots, N_b, 1 = 1, \ldots, N_b \quad (13)$$

The equivalent imaginary basis matrices $$j\beta_{kl}^W,$$

are formed by taking each of the matrices formed using equation (13) and multiplying them by the imaginary number j. Together the real and imaginary Weyl matrices form the complete basis set with $2N_b^2$ elements for transmitting from at least $N_b$ antenna elements. This basis set is based on a system having a transmit diversity of at least $N_b$ and symbol rate $K=N_b$ (in other words the maximum number of parallel streams). These codes though as discussed above only reach capacity where there are $N_b$ non-correlated channels. This basis set for signalling with rate $K=N_b$ was discussed in the paper "High rate codes that are linear in space and time" by B. Hassibi and B. Hochwald, IEEE Transaction on Information Theory, June 2002, which is incorporated by reference.

A second set of known basis sets is the Hadamard (Threaded) basis set. These basis sets are defined where $N_b=2^q$ (where q is a integer) transmission beams. The Hadamard basis set can be defined as in equation (13), with the difference that the powers of the diagonal matrix D are replaced with specific diagonal matrices which have rows of Hadamard matrices as diagonal elements. For $N_b=4$ transmission beams, the Hadamard matrix is $$\begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

The matrix $D^0$ is the identity matrix, as in equation (13). The other powers of D in equation (13) are replaced by $$D^1 \mapsto \begin{bmatrix} 1 & 0 & 0 & 0 \\ 0 & -1 & 0 & 0 \\ 0 & 0 & 1 & 0 \\ 0 & 0 & 0 & -1 \end{bmatrix}, D^2 \mapsto \begin{bmatrix} 1 & 0 & 0 & 0 \\ 0 & 1 & 0 & 0 \\ 0 & 0 & -1 & 0 \\ 0 & 0 & 0 & -1 \end{bmatrix}, D^3 \mapsto \begin{bmatrix} 1 & 0 & 0 & 0 \\ 0 & -1 & 0 & 0 \\ 0 & 0 & -1 & 0 \\ 0 & 0 & 0 & 1 \end{bmatrix}.$$

The resulting basis set has very similar properties to the Weyl basis set. Space-time codes with this basis set have been discussed in the paper "An algebraic number theoretic framework for space-time coding" by H. El Gamal and O. Damen, IEEE International Symposium of Information Theory, June 2002, which is incorporated by reference.

A third set of known basis sets are known as the Clifford basis set. These basis sets are defined where $N_b=2^q$ (where q is a integer) transmission beams. The Clifford basis set is an extension to the Alamouti basis used to form the space-time code given in equations (2) and (3) in the case of two antennas. The Alamouti basis set is shown in equation (14).

$$\tau_0 = I_2 = \begin{bmatrix} 1 & 0 \\ 0 & 1 \end{bmatrix}; \tau_1 = \begin{bmatrix} 0 & 1 \\ -1 & 0 \end{bmatrix}; \tau_2 = \begin{bmatrix} 0 & j \\ j & 0 \end{bmatrix}; \tau_3 = \begin{bmatrix} j & 0 \\ 0 & -j \end{bmatrix} \quad (14)$$

The four matrices seen above represent the first four of the eight matrices, the other four being the equal to the first four multiplied by the imaginary number j. For example, the Alamouti code matrix C originally defined in equation (2) can be seen to be the combination of the real part of a first symbol $S_1$ with the first matrix $\tau_0$, a real part of a second symbol $S_2$ and the second matrix $\tau_1$, the imaginary part of a first symbol $S_1$ and $\tau_3$, and the imaginary part of a second symbol $S_2$ and $\tau_2$. The Clifford basis has $2N_b^2$ elements, each of them is used for signalling at the rate $K=N_b$. MIMO modulations based on the Clifford basis set, with a rate equal to the number of beams, in other words when $K=N_b$ and with simultaneous transmit diversity have been discussed in Finnish patent application 20011357 which is incorporated by reference. In this Finnish application the number of orthogonal resources is also equal to the number of beams and therefore the code matrix C is always square.

In schemes using Weyl, Hadamard, and Clifford basis sets some degree of exhaustive search is carried out over the full constellation of symbols in order to decode the coded symbol.

Also a further disadvantage with the Weyl basis method is that in order to de-code these complex values at the receiver a complex search method such as maximum likelihood or sphere decoding is required which searches over the whole signal space.

The Clifford basis set derived codes have a remnant Radon-Hurwitz (RH) orthogonality. This means that there are non-trivial subsets of symbols that are mutually orthogonally encoded, whereas there is non-orthogonality between the subsets. Each such set is thus a generalized orthogonal design of the type discussed in the paper "Space-time block codes from orthogonal designs" by Tarokh, Jafarkhani and Calderbank, IEEE Transactions on Information theory 45, pp 1456-1467, July 1999. The simplest orthogonal design is the Alamouti code discussed above in equation (2). The RH-orthogonality of the Alamouti code is expressed by the equation (15):

$$C^H C = (|S_1|^2 + |S_2|^2) I \quad (15)$$

where I is the $N_t \times N_t$ (in this case 2×2) identity matrix. The Clifford-algebra based code $C_2$ in equation (3) has two subsets that are orthogonal design based, and thus has a two-complex-symbol (or four-real-symbol) remnant orthogonality. This orthogonality can be exploited to reduce the decoding complexity, whether sphere decoding or some other simplified maximum likelihood decoder is used.

In other words, it is possible to split elements of the code into different subsets. Rather than searching for the possible coded value over the whole space defined by the full set coding scheme, it is possible to perform a series of simpler searches over a smaller series of spaces defined by each sub-set of blocks.

This orthogonality can be expressed as a sum. If a MIMO RH-orthogonal code has 2KT real symbols of which $K_1$ are RH-orthogonal between each other, a second sub-set $K_2$ are RH-orthogonal between each other, and so on, then the code can be written as a $K_1+K_2+\ldots$ layered code. In this case the sum of the various orthogonal sub-set components add up to the total number of real 2KT symbols $\Sigma K_i=2KT$. For example, consider a scheme with three real symbols, and there is no remnant orthogonality. This code would be 1+1+1 layered, there would be no two symbols that would be mutually RH-orthogonal. For complete maximum likelihood detection, a collection of points dispersed in a volume of space is required to be searched. If instead it is known that the code is a 2+1 layered, the two RH-orthogonal symbols may be detected independently. Thus it is necessary only to search through a selection of points on a line, corresponding to the third symbol, and for each of these points, perform a set of linear operations to detect the two RH-orthogonal symbols.

The complex diversity transforms of the kind shown in code matrices $C_2$ and $C_4$ in equations (3) and (4) further introduces diversity into the coding scheme. The code as shown in equation (3) comprises 4 complex symbols (or 8 real symbols) transmitted during T=2 time periods from $N_b=2$ beams. Using the above layer code definition this code can also be considered to be 4+4 layered.

Two further known code systems where the code rate is constrained to be half the number of beams $K=N_b/2$, for four transmit beams $N_b=4$ are Double STTD (Space Time Transmission Diversity) codes and Double ABBA. ABBA is a nickname of the code which is of the form $$\begin{bmatrix} C_A & C_B \\ C_B & C_A \end{bmatrix},$$

where $C_A$ and $C_B$ are both Alamouti blocks of the form given in equation (2).

Double STTD involves the transmission of $N_b/2$ independent 2×2 Alamouti blocks from $N_b/2$ pairs of different antennas. In a four antenna system this represents a K=2 rate transmitting KT=4 complex symbols over T=2 resources, using the code matrix in equation (16).

$$C = \begin{bmatrix} S_1 & S_2 & S_3 & S_4 \\ -S_2^* & S_1^* & -S_4^* & S_3^* \end{bmatrix} \quad (16)$$

The code matrix C is in this example formed from the four symbols $S_1$, $S_2$, $S_3$, $S_4$ transmitted using a first orthogonal transmission resource, in the example of a TDM system a first time period, and the symbols $S^*_1$, $-S^*_2$, $-S^*_3$, $S^*_4$ transmitted using a second orthogonal resource, again in a TDM system a second time period. Where $S^*_1$ represents the complex conjugate of the complex symbol $S_1$.

The double ABBA code uses Quadrature Phase Shift Keying (QPSK) symbols to create a rate K=2 code, using the code matrix in equation (17).

$$C = \begin{bmatrix} S_1+S_3 & S_2+S_4 & S_5+S_7 & S_6+S_8 \\ -S_2^*-S_4^* & S_1^*+S_3^* & -S_6^*-S_8^* & S_5^*+S_7^* \\ S_5-S_7 & S_6-S_8 & S_1-S_3 & S_2-S_4 \\ -S_6^*+S_8^* & S_5^*-S_7^* & -S_2^*+S_4^* & S_1^*-S_3^* \end{bmatrix} \quad (17)$$

In this code block $S_1$, $S_2$, $S_5$, $S_6$ are QPSK modulated symbols and $S_3$, $S_4$, $S_7$, $S_8$ are phase rotated QPSK modulated symbols. One of the problems associated with the use of QPSK and phase rotated QPSK symbols in the same code block is that there is a possibility of error events with a singular distance matrix. For advantageous performance, all symbols should be capable of being distinguished between each other by transmission over all four beams. This is not so for the scheme described by equation (17). Some symbol combinations can be distinguished on information transmitted over only two beams. This is easy to show in an example. Consider the case where there is a detection error $\Delta$ in detecting $S_2$, and a detection error $e^{i\varphi}\Delta$ in detecting $S_7$. All of the other symbols are detected without errors. The rotation of the QPSK symbol $S_7$ is denoted by the phase factor $e^{i\varphi}$. The codeword difference matrix, which expresses the protection difference that the code provides against an error event, is given in equation (18).

$$\begin{bmatrix} 0 & \Delta & e^{i\varphi}\Delta & 0 \\ -\Delta^* & 0 & 0 & e^{-i\varphi}\Delta^* \\ -e^{i\varphi}\Delta & 0 & 0 & \Delta \\ 0 & -e^{-i\varphi}\Delta^* & -\Delta_2^* & 0 \end{bmatrix} \quad (18)$$

This is clearly singular irrespective of the value of the rotation $e^{i\varphi}$. There are only two linearly independent rows (and columns) in the matrix. Thus the transmit diversity protection against these kind of errors is only two-fold, compared to the maximal four-fold transmit diversity protection that can be reached with four transmit antenna resources. Performance in high Signal to noise ratio environments particularly suffer because of this as diversity benefits increase with the signal to noise ratio.

One way to measure the effectiveness of a code is to examine for a given code matrix its diversity D and self-interference SI matrices as detailed in equations (19), (20), and (21).

$$C^*C = \frac{1}{2}\sum_{k=1}^{k=2KT}\sum_{i=1}^{i=2KT} x_k x_i SI^{(k,i)} = D + SI \quad (19)$$

$$D = \frac{1}{2}\sum_{k=1}^{k=2KT} x_k^2 SI^{(k,k)} \quad (20)$$

$$SI = \sum_{i=1}^{i=2KT}\sum_{k=i+1}^{k=2KT} x_i x_k SI^{(i,k)} \quad (21)$$

Equation (19) represents the power of the code matrix C*C, as the product of the 2KT real and imaginary parts of the KT complex symbols (KT real and KT imaginary) multiplied by a Self-Interference factor. The Self-Interference coefficients can themselves be combined to form a Self-interference matrix (SI) wherein their position is dependent on the real symbol values as shown in equation (21). The Self-Interference coefficients are also known as the Radon-Hurwitz anticommutators. These coefficients can be calculated from the basis matrices using equation (22).

$$SI^{(i,k)} = \beta_i^* \beta_k + \beta_k^* \beta_i \qquad (22)$$

The diversity matrix D in equation (20) is the part of the matrix C*C which is dependent on the real symbol powers $x_k^2$. The diversity matrix encodes the distribution of transmit power of the individual real symbols over the multiple transmit beams and measures how well the code exploits the inherent transmit diversity of the system.

The self-interference (non-orthogonality) induced by the code is displayed in the matrix SI. It provides a measurement to what extent the encoded symbols interfere with each other and therefore affects directly the capacity and indirectly the performance of the code.

When $SI^{(k,i)}=0$ for some $k \neq i$, the corresponding symbols $x_k$ and $x_i$ are said to be Radon-Hurwitz orthogonally encoded (RH-orthogonal). A set of RH-orthogonally encoded symbols construct an orthogonal design, which has an optimal linear decoding scheme.

The Frobenius inner product of basis matrices $\beta_i$ and $\beta_k$ encoding real symbols $x_i$ and $x_k$ respectively, is described by equation (23) below. This inner product measures the linear independence of the basis matrices.

$$M_{k,i}^{FB} = Tr(SI^{(k,i)}) \qquad (23)$$

If the Frobenius inner product of the basis matrices is equal to zero, in other words $$M_{k,i}^{FB} = 0$$

for some $k \neq i$, the basis matrices are linearly independent, and the corresponding symbols $x_k$ and $x_i$ are said to be Frobenius orthogonally encoded (FB-orthogonal). A set of FB-orthogonal basis matrices is a subset of a linearly independent basis set m with a dimension of $T \times N_b$. This advantageous set of linearly independent matrices form an orthogonal basis for all $T \times N_b$ matrices with complex coefficients. The space-time modulator in this embodiment of the present invention uses codes designed to have a given orthogonal resource span $T = N_b$, and with a transmit diversity order also defined as $N_b$. This provides that each basis set element $\beta_k$ is defined as an unitary matrix (A unitary matrix is one where the transpose of its complex conjugate is equal to its inverse) with dimension $N_b \times N_b$. The basis matrices $\beta_k$ are further selected in embodiments of the present invention so that their total self-interference is minimized, this in turn maximises capacity.

The capacity SCap, as well as the mutual information MInf of a transmission scheme can be Taylor expanded as a infinite series sum of the orders of the Signal to noise ratio (SNR) $\rho$ as is shown in equations (24) and (25).

$$SCap = \sum_{n=1}^{n=\infty} \rho^n SCap_n \qquad (24)$$

-continued $$MInf = \sum_{n=1}^{n=\infty} \rho^n MInf_n \qquad (25)$$

A modulation scheme that achieves capacity has equal coefficients for different orders of the expansion. In other words $MInf_n = SCap_n$ for all values of the index n.

In a modulation scheme which is symmetric with respect to the origin, i.e. if C is a possible transmission matrix, −C is also a possible transmission matrix, then the first order Mutual information is equal to the first order capacity, both of which is equal to the power constraint of the system which is a value related to the average symbol energy value. This is shown in equation (26).

$$MInf_1 = SCap_1 = \sum_{k,i} M_{k,i}^{FB} = P \qquad (26)$$

Here it has been assumed that the average value of $x_k^2$ is one for each real symbol, and P is the average transmission power.

Typical discrete modulation schemes, based on QPSK, M-QAM modulation schemes cannot reach capacity in orders higher than n=2. This is a consequence of the fact that capacity achieving signalling is based on the use of Gaussian distributed signal sets, whereas typical modulation schemes are far from distributed using a Gaussian distribution. The difference between Gaussian signal sets and typical discrete modulation schemes only becomes observable in expansion orders higher than n=2. Thus in using such modulation schemes, it becomes essential to maximize $MInf_2$, the second order mutual information to choose an advantageous basis set. This value of $MInf_2$ is always negative, and for $N_r$ receive antennas it can be expressed according to equation (27) as:

$$MInf_2 = -\frac{N_r}{4}\left(\sum_{k,i} Tr(SI^{(k,i)}) + N_r \sum_{k,i} (Tr(SI^{(k,i)}))^2\right) \qquad (27)$$

Where Tr(*) is the trace of *, the sum of the diagonal elements. The first term of equation (27) is proportional to the total self-interference, which in producing an advantageous code as described previously should be minimized. The second term of equation (27) indicates that the sum of the squared FB inner products should be minimized, which leads to the creation of FB-orthonormal coefficient matrices. This means that all coefficient matrices are linearly independent in terms of the Frobenius inner product, and in addition, that the Frobenius norms of all coefficient matrices are the same. The first and second terms of equation (27) cannot always be minimised independent of each other. In other words it is sometimes allowable to produce FB-orthogonal, but not orthonormal bases by jointly minimizing both terms.

Solving the above problem, and finding the maximum second order mutual information, each coefficient matrix $\beta_i$ fulfils equation (28):

$$N_r \sum_{k=1}^{k=2KT} \beta_k Tr(S^{(k,i)}) + \beta_i \sum_{k=1}^{k=2KT} \beta_k^* \beta_k + \sum_{k=1}^{k=2KT} \beta_k \beta_i^* \beta_k = \lambda \beta_i \quad (28)$$

for some real constant value $\lambda$ (the same constant applying for all members of the basis set $\beta_i$).

Where in embodiments of the present invention an advantageous diversity basis is selected, each coefficient matrix is unitary, so the second term in left-hand-side of equation (28) is trivially proportional to $\beta_i$. In embodiments of the present invention, possible FB-orthogonal (but not necessarily orthonormal) bases are selected, which agree with equation (29).

$$Tr(SI^{(k,i)}) = \rho_k \delta_{k,i} \quad (29)$$

The power of the coefficient matrix $\beta_k$ is $p_k$. The value $\delta_{k,i}$ is known as the Kronecker delta and defined as being equal to 1 when the values k=i and equal to 0 when k≠i. Typically all coefficient matrices have the same power, but in some cases the optimal codes do not have this property. With unitary coefficient matrices and applying equation (29), equation (28) reduces to the form provided by equation (30), $$\sum_{k=1}^{k=2KT} \beta_k \beta_i^* \beta_k = (\tilde{\lambda} - N_r p_i)\beta_i, \; i = 1, \ldots, 2KT \quad (30)$$

where $\tilde{\lambda}$ is a constant, related to but not necessarily equal to $\lambda$.

Embodiments of the present invention having selected advantageous basis sets can also select the diversity transform which will produce an advantageous combination of these basis matrices in order that the diversity of transmission can be improved. In order to find such advantageous transforms the performance at high signal to noise ratios must be measured.

Performance at high SNR is measured by the "determinant distance". The possible error vector $\vec{\Delta}$, where each $\Delta_k$ is an error that is possible to make when detecting $x_k$. In other words what is the possible detection error which is allowable when detecting symbol $x_k$ while still being able to decode the correct symbol.

This determinant distance can be defined by the value shown in equation (31)

$$D_{det}(\vec{\Delta}) = det(C^\dagger C)(\vec{\Delta}) \quad (31)$$

The determinant distance differs from the Diversity and Self Interference measures by being a function of the distance between symbols rather than being a function of the symbols themselves.

A diversity transform can be applied to the real symbols in a manner similar to the diversity transforms applied to the space-time codes $C_2$ and $C_4$ described in equations (3) and (5). The product of the transformed real symbols produces superconstellations (modulations that are formed by combining two constellations in a known manner) that advantageously improve the performance of the codes. An advantageous superconstellation of symbols is one where the minimum value of the determinant distance (over the set of all possible error events) is as big as possible. In other words an advantageous superconstellation is one in which the superconstellation is chosen to maximise the minimum determinant value over all set values.

All diversity transforms that preserve the mutual information of the code are elements of the group of orthogonal 2KT×2KT matrices. The space in which an advantageous set of values is to be found, or in other words the space spanned by these matrices, is very large. However, the optimal diversity transforms can be found from a much smaller set.

Figure 7:
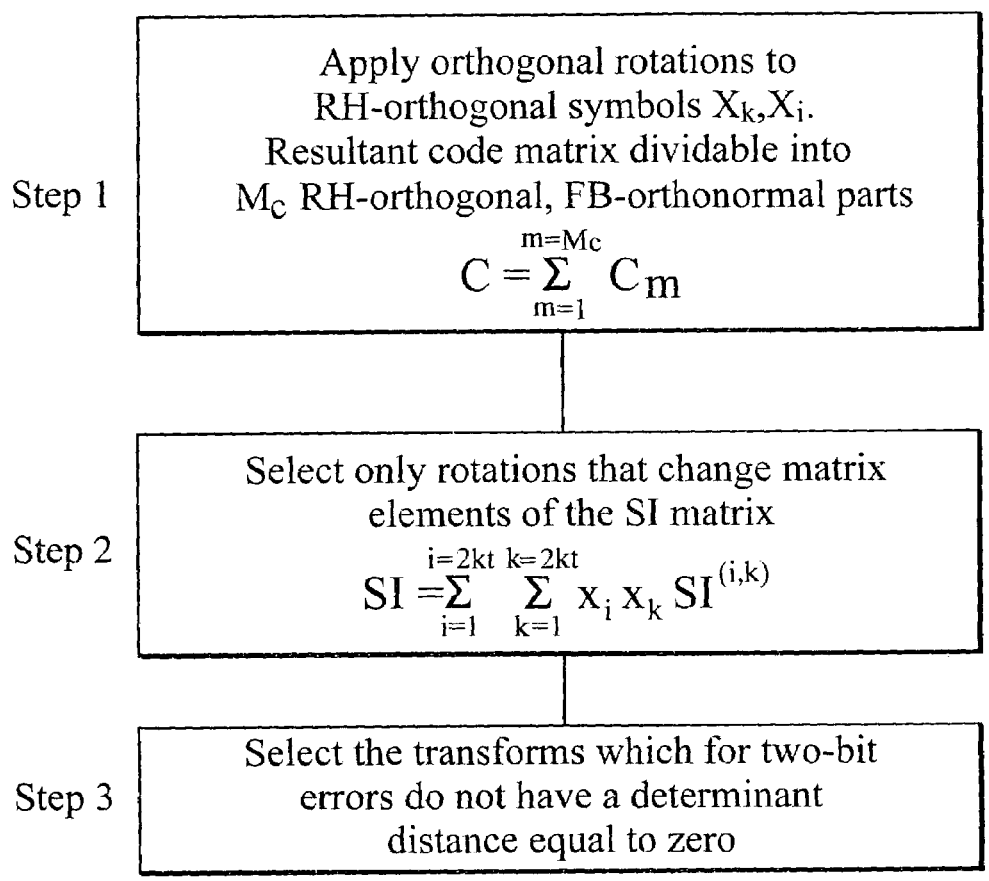
FIG. 7 shows a flow diagram embodying a method for selecting space-time diversity transforms embodying the present invention.

FIG. 7 represents a flow diagram of the method of finding an advantageous diversity transform.

Step 1. Apply orthogonal rotations that combine the symbols $x_k$, $x_i$ which are themselves RH-orthogonally encoded, and have the same diversity: $S^{(k,i)}=0$ and $S^{(k,k)}=S^{(i,i)}$. The resultant code matrix can be divided into $M_c$ parts, each of which is RH-orthogonal, and FB-orthonormal, and which when summed form the full code matrix as shown in equation (32).

$$C = \sum_{m=1}^{m=M_c} C_m \quad (32)$$

The advantageous diversity transforms act on some of these $M_c$ parts and do not mix these parts. In other words there can be considered to be $M_c$ diversity transforms $D_{mc}$, which act as orthogonal rotations on the symbols in one of the $C_m$ sub-groups.

Step 2. Select only those rotations that change the matrix elements of the self-interference matrix SI as described in equation (21).

Step 3. Select the diversity transforms that produce transforms that for a two-bit error event the determinant distance does not vanish.

In embodiments of the present invention using the method detailed above and as shown in FIG. 7, a series of basis sets and diversity transforms can be selected which have advantageous characteristics. These basis sets and transforms can then be used in further embodiments of the space-time modulator to be combined with the symbols to create the space-time codes.

These basis matrices and code sets can then be used in order to determine punctured code scheme.

A punctured code scheme differs from a normal code scheme in that some of the symbols which would be coded by the space time coder are removed. Effectively a punctured code scheme trades the advantageous capacity provided by the use of a space-time code system in order that a receiver is able to receive and decode the space-time modulated signal. A punctured code is therefore capable of being employed in embodiments of the invention to a system wherein the complexity of the receiver in terms of processing capability and receiver capability widely differ. Within such a divergent system the conventional and space-time modulation systems embodying the invention can monitor, adapt and scale the modulation schemes taking into consideration the receiver and the receive paths characteristics while attempting to maintain advantageous transmission capacity.

The first set of codes as used in embodiments of the present invention are the 2-fold transmit diversity codes where K=2. These have been discussed previously. The Clifford basis for 2-fold transmit diversity is a unitary basis matrices with dimensions 2×2. The complete basis set of complex 2×2 matrices with real coefficients has 8 elements (these eight elements comprising four elements representing the real part of the complex symbol and the four elements representing the imaginary part of the complex symbol).

As has been discussed earlier four of the Clifford basis matrices are the first four matrices of the Alamouti basis as shown in equation (14), and the same equation (14) matrices multiplied by the imaginary number j form the second group of four matrices.

For two transmit beams $N_b=2$, and two resource elements $T=2$, the double rate $K=2$ case was discussed at length above, with the resultant 4+4 layered code. For rate $K=1$, the Alamouti code is advantageous.

A scalable and adaptable family of punctured codes can be constructed from this scheme. Rather than using the full rate $K=2$ embodiments of the invention with two-fold diversity, can transmit over two beams with a rate of $K=3/2$. In other words transmitting 6 real symbols rather than the non-punctured code scheme transmitting 8 real symbols over two time periods. The transmission of 6 real symbols can be encoded in embodiments of the space time modulator as either a 3+3 or 4+2 layered code. In the 3+3 layered code one real symbol from each orthogonal block can be removed. In the alternate 4+2 layered code two realsymbols from either the first or second of the two blocks is removed. The embodiment featuring the 4+2 layered code scheme is advantageous in terms of decoding as the smaller block that has to be searched over occupies a two variable space only. This 4+2 layered scheme is closer to the (4+0) layered Alamouti code shown in equation (2). The advantageous basis in terms of mutual information is the embodiment which removes a symbol from each orthogonal block, for example as shown by the set in equation (33).

$$B=\{\tau_0,\tau_1,\tau_2,j\tau_0,j\tau_1,j\tau_2,\} \quad (33)$$

The code matrix formed by using such a basis set would be a 3+3 layered code of as shown in equation (34).

$$\begin{bmatrix} x_1 & S_2 \\ -S_2^* & x_1 \end{bmatrix} + \begin{bmatrix} jx_3 & S_4 \\ S_4^* & jx_3 \end{bmatrix} \quad (34)$$

With comparison to the $K=2$ scheme provided by complex diversity transformed Clifford basis codes as shown in equation (3), one bit is punctured from each of the orthogonal sub-blocks; above the imaginary part of $S_1$ and the real part of $S_3$ have been punctured (in other words the imaginary part of $S_1$. and the real part of $S_3$ have been removed).

A diversity transform optimizing performance now acts on the three real symbols $\{x_3, S_4\}$.

For embodiments of the present invention applied to 4-fold transmit diversity, in other words when the number of transmit beams is equal to four, $N_b=4$, and four orthogonal resources are used $T=4$ for transmission of each symbol, the Clifford basis provides a unitary basis for 4×4 matrices. The Weyl 4×4 basis also shows unitary behaviour. Any other unitary matrix may also be used from the transmit diversity point of view. Advantageous transmitted puncturing schemes are based on the Clifford basis.

The complete Clifford basis set of 4×4 matrices with real coefficients has 32 elements (16 elements representing the real symbol parts and 16 elements representing the imaginary symbol parts). The first sixteen elements can be determined by the tensor products of the four 2×2 Clifford basis matrices as given by equation (35).

$$\beta_{\mu,\nu}=\tau_\mu \otimes \tau_\nu, \mu,\nu \in \{0,1,2,3\} \quad (35)$$

The remaining sixteen elements being formed by multiplying the first sixteen elements by the imaginary number j.

It is practical to divide these 32 matrices into 8 sets each comprising 4 elements. The first 4 sets are defined in equation 36 below. In general each set comprises of elements with a fixed first tensor product element $\mu$ and a second variable element $\nu$. The second 4 sets are simply the imaginary number j multiplied by the elements of the first four sets. In other words the set of 32 matrices comprises $B_\mu$ and $jB_\mu$.

$$B_1=\{\beta_{1\nu}\}_{\nu=0}^{3}, \quad B_2=\{\beta_{2\nu}\}_{\nu=0}^{3} \quad B_3=\{j\beta_{3\nu}\}_{\nu=0}^{3}, \quad B_4=\{j\beta_{4\nu}\}_{\nu=0}^{3} \quad (36)$$

For example the set of four elements comprising $B_1$ are shown in equation (37).

$$\beta_{10}=\begin{bmatrix} 0 & 0 & 1 & 0 \\ 0 & 0 & 0 & 1 \\ -1 & 0 & 0 & 0 \\ 0 & -1 & 0 & 0 \end{bmatrix}; \quad \beta_{11}=\begin{bmatrix} 0 & 0 & 0 & 1 \\ 0 & 0 & -1 & 0 \\ 0 & -1 & 0 & 0 \\ 1 & 0 & 0 & 0 \end{bmatrix} \quad (37)$$

$$\beta_{12}=\begin{bmatrix} 0 & 0 & 0 & j \\ 0 & 0 & j & 0 \\ 0 & -j & 0 & 0 \\ -j & 0 & 0 & 0 \end{bmatrix}; \quad \beta_{13}=\begin{bmatrix} 0 & 0 & j & 0 \\ 0 & 0 & 0 & -j \\ -j & 0 & 0 & 0 \\ 0 & j & 0 & 0 \end{bmatrix}$$

Advantageously constrained schemes with rate $K=1$ have been widely discussed in the prior art and above. One example of an optimal rate 1 scheme is that shown in the ABBA scheme, discussed above and given by the basis shown in equation (38).

$$B^1=B_0 \cup B_2 \quad (38)$$

The symbol $\cup$ represents a union of the two matrix sets. This union may involve applying a diversity transform in order to separate the two sub-sets. Embodiments of the present invention with constrained schemes with higher rates i.e. with rates $K>1$ are now discussed in more detail.

A first example of a basis with a transmission rate of 3/2 as used in embodiments of the present invention with advantageous mutual information comprises the 12 matrices combined as shown in equation (39).

$$B^{3/2}=B_0 \cup e^{j\pi/3}B_1 \cup e^{-j\pi/3}B_3 \quad (39)$$

Many other combinations combining the B matrix groups can be used. Some combinations would be as good as the above form, most though would be less advantageous.

In order to increase the transmission rate to a two fold rate, i.e. $K=2$, codes that reach second order capacity with a receive diversity of one are constructed and used in embodiments of the invention. An example of one such basis used in embodiments of the invention can in embodiments of the space-time modulator be constructed from the basis shown in equation (40)

$$B^2=B_0 \cup B_1 \cup B_2 \cup B_3 \quad (40)$$

Where complex symbols $S_1$ and $S_2$ are encoded by $B_0$, complex symbols $S_5$ and $S_6$ by $B_2$, complex symbols $S_3$ and $S_4$ by $B_3$, complex symbols $S_7$ and $S_8$ by $B_1$, this basis combination yields the double ABBA code matrix as discussed previously in equation (17) and repeated below.

$$C = \begin{bmatrix} S_1+S_3 & S_2+S_4 & S_5+S_7 & S_6+S_8 \\ -S_2^*-S_4^* & S_1^*+S_3^* & -S_6^*-S_8^* & S_5^*+S_7^* \\ S_5-S_7 & S_6-S_8 & S_1-S_3 & S_2-S_4 \\ -S_6^*+S_8^* & S_5^*-S_7^* & -S_2^*+S_4^* & S_1^*-S_3^* \end{bmatrix} \quad (17)$$

A further advantageous diversity transformation for a QPSK modulation scheme is provided by the phase rotation $e^{j\pi/4}$ (45 degrees) acting on $S_3$ and $S_4$, a matrix rotation given by equation (41) below acting on $S_7$ and $S_8$, and the matrix rotation $e^{j\pi/4}U_b$ acting on $S_5$ and $S_6$.

$$U_b = \frac{1}{\sqrt{7}}\begin{bmatrix} 1+j & 1+2j \\ -1+2j & 1-j \end{bmatrix} \quad (41)$$

The minimum determinant distance given by this combination is 0.021.

Further embodiments of the invention improve on this combination by using the basis combination shown in equation (42).

$$B^2 = B_0 \cup \tilde{B}_1 \cup \tilde{B}_2 \cup B_3 \quad (42)$$

where $$\tilde{B}_k = \begin{bmatrix} 1 & 0 & 0 & 0 \\ 0 & 1 & 0 & 0 \\ 0 & 0 & j & 0 \\ 0 & 0 & 0 & j \end{bmatrix} B_k$$

and the operation of a matrix on a set of matrices B is defined as the set of matrices resulting from operating with the matrix on all elements of the set B. This combination provides the same mutual information, and yields the code matrix shown in equation (43):

$$C^{\tilde{2}} = \frac{1}{2}\begin{bmatrix} S_1+S_5 & S_2+S_6 & S_3+S_7 & S_4+S_8 \\ -S_2^*-S_6^* & S_1^*+S_5^* & -S_4^*-S_8^* & S_3^*+S_7^* \\ j(S_3-S_7) & j(S_4-S_8) & S_1-S_5 & S_2-S_6 \\ j(-S_4^*+S_8^*) & j(S_5^*-S_7^*) & -S_2^*+S_6^* & S_1^*-S_5^* \end{bmatrix} \quad (43)$$

The embodiments of the present invention can use a simple constellation rotation of 26.5 degrees applied to complex symbols $S_5$, $S_6$, $S_7$, $S_8$. The minimum determinant distance for this code therefore is 0.04. In practice, a rotation between 24 and 30 degrees provides the greatest advantageous performance improvement. This is a greater minimum determinant distance than was given using the scheme based on equation (40).

This code, as used in embodiments of the invention, can be considered to be the code corresponding to Alamouti's code but for four-fold transmit diversity. This code is therefore capable of reaching capacity for one receive antenna, and has a minimal self-interference for any number of receive antennas for a code with fourth order transmit diversity.

One example of a basis for a transmission rate greater than 2, in this example a rate 5/2 (or two and half) code as used in embodiments of the present invention with an advantageous mutual information, comprises 20 matrices (each comprising 5 sub-blocks comprising 4 matrices) as shown in equation (45).

$$B^{5/2} = B_0 \cup \tilde{B}_1 \cup \tilde{B}_2 \cup B_3 \cup jB_0 \quad (45)$$

In embodiments of the present invention employing a symbol-rate K>2, a further consideration emerges in information optimal MIMO-modulations. In the rates K≦2, the number of receive antennas resources $N_r$ did not play any role in symbol constellation design. The same symbol constellations are information advantageous irrespective of the number of receive antennas.

For rates higher than 2, 2<K<4, the number of receive antennas $N_r$ affects the choice of modulation design. The effect of $N_r$ is in determining the symbol transmission relative power in embodiments of the present invention. These modulations therefore produce modulation schemes with unequal symbol transmission power.

For $N_r$ receive antennas, one example of a basis for a rate K=3 code with an advantageous value for mutual information as used in embodiments of the present invention is shown in equation (46).

$$B^3 = B_0 \cup \tilde{B}_2 \cup jB_0 \cup j\tilde{B}_2 \cup \quad (46)$$
$$\sqrt{\frac{N_r}{2N_r-1}}(\tilde{B}_1+jB_3) \cup \sqrt{\frac{N_r}{2N_r-1}}(j\tilde{B}_1+B_3)$$

In this basis set, two sets of matrices are summed to produce a hybrid set. For example the $j\tilde{B}_1+B_3$ set is interpreted as four basis matrices, the n'th matrix of the hybrid set being the sum of the n'th matrix in $j\tilde{B}_1$ and the n'th matrix in $B_3$.

Further embodiments of the present invention can use a single basis which is independent of $N_r$ (or the PRN of the channel). In further embodiments of the invention the value used in the basis equation (46) independent of the communication system is $N_r=2$.

The fact that different symbols are transmitted with different power in a code based on (46) can be advantageously exploited in a multi-modulation scheme, where symbols transmitted with a higher power are allocated more bits than symbols transmitted with a lower power.

For four fold transmission rates, in other words where K=4, codes that reach second order capacity with any $N_r$ can be constructed in embodiments of the present invention by using the full Clifford basis as shown in equation (47).

$$B^4 = B_0 \cup B_1 \cup B_2 \cup B_3 \cup jB_0 \cup jB_1 \cup jB_2 \cup jB_3 \quad (47)$$

However, further embodiments of the invention improve upon the performance of equation (47) and use the alternative basis given in equation (48).

$$B^4 = B_0 \cup \tilde{B}_1 \cup \tilde{B}_2 \cup B_3 \cup jB_0 \cup j\tilde{B}_1 \cup j\tilde{B}_2 \cup jB_3 \quad (48)$$

In embodiments of the present invention this basis set produces the same mutual information as $B^4$ shown in equation (47), but can be constructed to yield a better determinant distance. Performance is advantageously improved in embodiments of the present invention by applying an advantageous constellation rotation of 26.5 degrees on the symbols encoded by $\tilde{B}_1$ and $B_3$, and by applying the diversity transform $U_b$ as shown in equation (41) on the symbols encoded by $j\tilde{B}_2$ and $jB_0$, and by applying a combination of a constellation rotation of 26.5 degrees and diversity transform $U_b$ on the symbols encoded by $j\tilde{B}_1$ and $jB_3$.

These schemes defined above which can be used in embodiments of the present invention to provide advantageous space-time modulation codes in the example of four transmit beams and for transmission rates of K=1, 3/2, 2, 5/2, 3, 4. These transmission blocks can in further embodiments of the present invention be used as sub-blocks for transmission from more beams. Embodiments of the present invention can therefore construct optimal information modulations with a diversity of 4 for any number of antennas that is divisible with 4.

Furthermore a method as used in embodiments of the present invention will now be detailed, whereby the above space time coding schemes can be used in order to produce a method for puncturing a code system (i.e. removing parts from the code, resulting in a lower-rate code) designed to operate with four transmit beams, or in further embodiments a scheme to operate in an environment which has a number of antennas divisible by 4.

FIG. 8 shows a flow diagram of a puncturing scheme as applied to embodiments of the present invention. Where the receive diversity or practical rank number decreases, such as with increasing antenna correlation, or with decreasing numbers of receive antennas, a puncturing scheme operating on the optimal modulations follows the steps listed below.

Step 1. Where possible the use of a transmission rate equal to the number of beams is selected, in other words $K=N_b$. An example of such a scheme would for a $N_b=4$, T=4 scheme use 4 real symbols on each of the 8 components, such shown in equation (48).

Step 2. Where a transmission rate of $$K = \frac{3}{4}N_b$$

is required, a transmission scheme would be constructed by puncturing the 8 real symbols transmitted with respect to the basis sets $j\tilde{B}_1$ and $jB_3$. In one embodiment of the invention this is achieved by scaling the symbols transmitted on $\tilde{B}_1$ and $B_3$, and repeating these on $jB_3$ and $j\tilde{B}_1$. The resultant is the code scheme similar to that shown in equation (46).

Step 3. Where a transmission rate of $$K = \frac{5}{8}N_b$$

is required, a embodiments of the present invention would construct a transmission scheme by omitting the repetition and scaling, the 4 real symbols transmitted on $j\tilde{B}_2$ are therefore effectively punctured. The resultant scheme is similar to that shown in equation (45).

Step 4. Where a transmission rate of $$K = \frac{1}{2}N_b$$

is required, embodiments of the present invention would construct a transmission scheme by puncturing the four real symbols transmitted on $jB_0$. The resultant scheme is similar to that shown in equation (42).

Step 5. Where a transmission rate of $$K = \frac{3}{8}N_b$$

is required, embodiments of the present invention would construct a transmission scheme by puncturing the four real symbols on $\tilde{B}_2$. Also the basis set $B_1$ is used instead of $\tilde{B}_1$, and the symbols on $B_1$ and $B_3$ are diversity rotated. The resultant scheme is similar to that shown in equation (39).

Step 6. Where a transmission rate $$K = \frac{1}{4}N_b$$

is required, embodiments of the present invention would construct a transmission scheme by puncturing the four realsymbols on $B_3$. The resultant scheme is similar to that shown in equation (38).

A further set of space time codes wherein the capacity is less advantageous but require less complex decoding schemes can also be constructed using the Clifford basis and used in further embodiments of the invention.

For a system comprising of four transmit antennas $N_t=4$, the maximum number of RH-orthogonal complex symbols capable of being transmitted is 3 (or equivalently 6 real symbols). Constructing modulation schemes with this maximal remnant RH-orthogonality, reduce the decoding complexity by approximately a factor of 4.

In order to distinguish these schemes from the capacity optimal Clifford schemes discussed above these schemes are called 6-Clifford schemes.

For simplicity, the 32 elements in the Clifford basis are split into the following subsets.

$\tilde{B}_1 = \{\beta_{00}, \beta_{01}, \beta_{02}, j\beta_{13}, \beta_{23}, \beta_{33}\}$ $\tilde{B}_2 = \{j\beta_{00}, j\beta_{03}, j\beta_{02}, \beta_{11}, j\beta_{21}, j\beta_{31}\}$ $\tilde{B}_3 = \{\beta_{10}, \beta_{12}, \beta_{13}, \beta_{21}, \beta_{31}, j\beta_{01}\}$ $\tilde{B}_4 = \{\beta_{03}, j\beta_{10}, j\beta_{11}, j\beta_{12}, j\beta_{23}, j\beta_{33}\}$ $\tilde{B}_5 = \{\beta_{20}, \beta_{30}, \beta_{32}, j\beta_{32}, j\beta_{22}, j\beta_{20}, j\beta_{30}, \beta_{22}\}$ Each of the first four subsets $\tilde{B}_k$, k=1, 2, 3, 4 is a set of 6 RH-orthogonal coefficient matrices. The fifth sub-set is not orthogonal.

Embodiments of the present invention can construct a one and half fold transmission rate, K=3/2, code with 3 complex symbol remnant RH-orthogonality. One possible code is based on two sets of 6 RH-orthogonal coefficient matrices (creating a 6+6 layered code). A second possible code can be based on one set of 6 RH-orthogonal coefficient matrices, four matrices from another RH-orthogonal set, and 2 more matrices from a third RH-orthogonal set. This second possible code produces a 6+4+2 layered code. Within embodiments of the present invention there may be in use several alternative code sets with the same mutual information. One example of a 6+6 layered code is shown in equation (49).

$$B^{3/2,subopt} = \tilde{B}_1 \cup \tilde{B}_2 \qquad (49)$$

In further embodiments of the invention rate 2 codes with 3 complex symbol remnant RH-orthogonality may be created and used. One example of with an advantageous mutual information value is a 6+6+2+2 layered code basis as shown in equation (50).

$$B^{2,subopt}=\tilde{B}_1\cup\tilde{B}_2\cup\{\beta_{10},\beta_{12}\}\cup\{j\beta_{10},j\beta_{12}\} \quad (50)$$

Further embodiments of the invention may create and use rate 3 codes with 3 complex symbol remnant RH-orthogonality. One example of which with an advantageous mutual information value is a 6+6+6+2+2+2 layered code basis as shown in equation (51).

$$B^{3,subopt}=\tilde{B}_1\cup\tilde{B}_2\cup\tilde{B}_3\cup\{\beta_{20},\beta_{30},\beta_{32},j\beta_{32},j\beta_{22},j\beta_{20}\} \quad (51)$$

A third type of advantageously constrained signaling scheme based on the previously discussed weyl basis may also be used in embodiments of the invention. Continuing the same example of a four beam and four orthogonal resource transmission system, i.e. $N_b=4$ and $T=4$, the 32 elements of the possible set are divided up into 4 real subsets and their equivalent 4 imaginary subsets, comprising the real set multiplied by the imaginary number j.

$$B_1^W = \{\beta_{11}^W, \beta_{21}^W, \beta_{12}^W, \beta_{22}^W\}$$
$$B_2^W = \{\beta_{31}^W, \beta_{41}^W, \beta_{32}^W, \beta_{42}^W\}$$
$$B_3^W = \{\beta_{13}^W, \beta_{23}^W, \beta_{14}^W, \beta_{24}^W\}$$
$$B_4^W = \{\beta_{33}^W, \beta_{43}^W, \beta_{34}^W, \beta_{44}^W\}$$

Embodiments of the present invention requiring a rate $K=3/2$ code based on the Weyl basis with an advantageous mutual information, is given by equation (52).

$$B^{3/2,W}=B_1^W\cup jB_2^W\cup B_3^W \quad (52)$$

Embodiments of the present invention requiring a rate $K=2$ code based on the Weyl basis with an advantageous mutual information value is given by equation (53).

$$B^{2,W}=B_1^W\cup B_2^W\cup jB_1^W\cup jB_2^W \quad (53)$$

Embodiments of the present invention requiring a rate $K=3$ code based on the Weyl basis with an advantageous mutual information value is shown in equation (54).

$$B^{3,W}=B_1^W\cup B_2^W\cup B_3^W\cup jB_1^W\cup jB_2^W\cup jB_3^W \quad (54)$$

Table 1 shows a series of comparisons between the mutual information optimised schemes (4-Clifford), as used in embodiments of the present invention, against the decoder simplicity optimised 6-Clifford and Weyl schemes, DSTTD, and a constrained V-BLAST transmission.

In the V-BLAST scheme independent symbols are transmitted from the antennas, so that for rate $K=2$, only real modulations are used rather than the full complex modulations, and for rate $K=3$, real modulations are used in half the antennas.

The basis for quantitative comparisons used in table 1 is the second order mutual information $I_2$, which is related to the self-interference of the code. The distance of $I_2$ from second order capacity is measured in decibels. The numerical values are reported in Table 1. From experience with non-orthogonal codes, these values indicate the order of magnitude of a linear shift in performance. That is, irrespective of the operation point ($E_b/N_0$) or in other words the level of the average symbol energy to intrinsic noise ratio, a code providing more mutual information can be designed to perform better than a code providing less.

In addition to this improvement from information there is an additional improvement, which can be achieved by the diversity transforms discussed above. The further effect of these transforms on performance at high $E_b/N_0$ is dramatic.

From Table 1 it is clear that for reduced rates $K<N_b$ the best subsets of the Weyl basis provide consistently less mutual information than the constrained codes based on the Clifford basis, information optimised or decoder optimised. For all matrix valued modulations, the mutual information gain compared to punctured BLAST is considerable. For rate $K=2$, optimal 4-Clifford and DSTTD provide the same information. Optimal 4-Clifford as used in embodiments of the invention has better performance due to added transmit diversity.

TABLE 1

Mutual information of various space time modulation schemes over various rates and receive diversity

| Rate K | Scheme | $10\log_{10}$ $(Int_2/SC_2)$ |
|---|---|---|
| | | $N_r = 1$ |
| | | $N_r = 2$ |
| | | $N_r = 3$ |
| | | $N_r = 4$ |
| 3/2 | 4-Clifford | 0.28 |
| | | 1.25 |
| | | 1.83 |
| | | 2.22 |
| | 6-clifford | 0.63 |
| | | 1.48 |
| | | 2.01 |
| | | 2.36 |
| | Weyl | 1.32 |
| | | 1.97 |
| | | 2.38 |
| | | 2.67 |
| 2 | 4-Clifford | 0 |
| | | 0.67 |
| | | 1.09 |
| | | 1.38 |
| | D-STTD | 0 |
| | | 0.67 |
| | | 1.09 |
| | | 1.38 |
| | 6-Clifford | 0.41 |
| | | 0.97 |
| | | 1.33 |
| | | 1.57 |
| | Weyl | 0.79 |
| | | 1.25 |
| | | 1.55 |
| | | 1.76 |
| | Punctured Blast | 1.46 |
| | | 1.76 |
| | | 2.96 |
| | | 2.11 |
| 3 | 4-Clifford | 0 |
| | | 0.28 |
| | | 0.45 |
| | | 0.57 |
| | 6-Clifford | 0.14 |
| | | 0.35 |
| | | 0.49 |
| | | 0.59 |
| | Weyl | 0.28 |
| | | 0.46 |
| | | 0.58 |
| | | 0.67 |
| | Punctured Blast | 0.79 |
| | | 0.87 |
| | | 0.93 |
| | | 0.97 |

Figure 5:
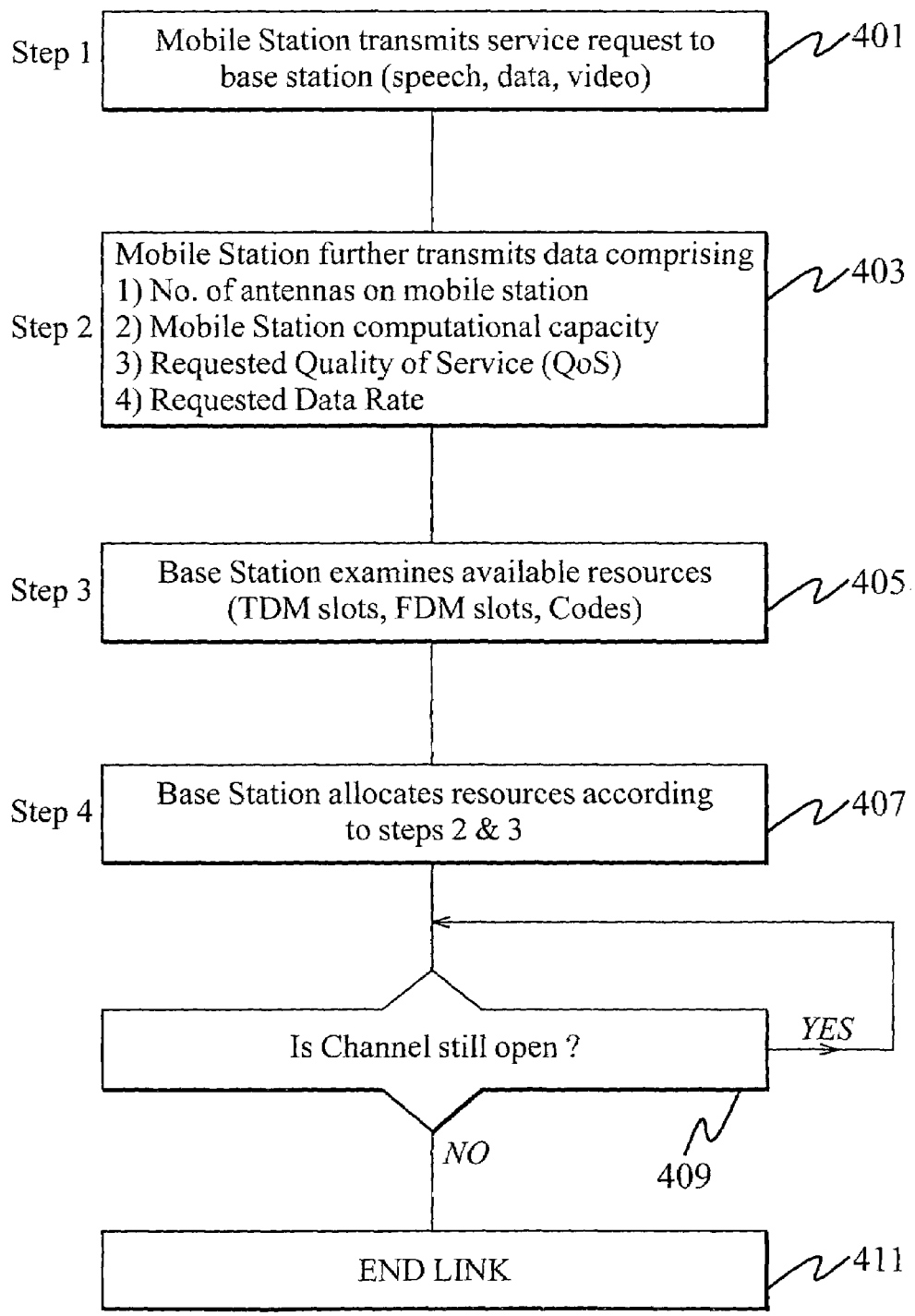
FIG. 5 shows a flow diagram of a first method embodying the present invention.

With reference to both FIGS. 2 and 5, the steps detailing an embodiment of the present invention is described in detail. The mobile station initially transmits a service request signal to the base station, as described in step 1. The service request can be a request for either speech, data or video transfer services. Of course the base station could alternatively initiate the signalling instead of the mobile station.

As then disclosed in step 2, the mobile station further transmits parameter data. According to embodiments of the present invention this parameter data can comprise; the number of antennas at the mobile station, the mobile station computational capacity limit, the mobile station requested quality of service (QoS), or the mobile stations requested data rate. The term quality of service should be interpreted broadly to cover all parameters relevant to the quality of service. Where the base station initiates signalling, the base station may send a request to the mobile station requesting this information. Similar base station parameter data is also retrieved from registers and is sent to the entity doing the decision making. The parameter data can include the corresponding information with respect to the base station, that is the number of base station antennas, the computational capacity of the base station, the base station requested quality of service or the base station requested data rate.

In some embodiments of the present invention, the computation capacity may be divided into classes or bands and the class of the mobile station or base station indicates the range in which the computational capacity of the mobile station or base station falls.

During step 3 the base station examines the available orthogonal resources. The available orthogonal transmission resources depend upon the embodiment the invention is incorporated within but may be time division multiplex slots, frequency division multiplex slots, or spreading codes. Additionally or alternatively, interference, traffic conditions such as traffic congestion may be taken into account.

In the next step, step 4, the base station allocates orthogonal transmission resources according to the results of steps 2 and 3. These orthogonal transmission resources may be different in various embodiments of the invention and may comprise time division multiplex slots, frequency division multiplex slots, spreading codes, and antennas.

This resource allocation is then kept static with the base station monitoring whether the channel is still requested, or still open. If the channel is closed or no longer requested, the link is closed and the resources are returned to the base station database.

This embodiment of using a mobile station or base station to initiate a call and the base station controller to optimise and control the transmission resources dependent on the available resources is an improvement over the known systems. This method contains greater flexibility over the methods found in the art, which allow a single decision to be made in a single orthogonal resource environment. Also the methods in the art do not allocate resources dependent on other users or user requirements.

In this embodiment of the present invention, the base station is described as making the decisions based on information received from the mobile station and/or the information about the base station. This decision can be made by any other suitable entity such as a base station controller or the like. Alternatively or additionally, the mobile station may make the decision based on information received from the base station about the base station capabilities and the like. In another alternative embodiment of the present invention, the decision making can be shared between the mobile station and the base station.

The information relating to the mobile station may not come from the mobile station in some embodiments of the present invention. Rather, the information may be available in a home location register and/or a visitor location register or similar database accessible to the base station.

A further embodiment of the present invention incorporates the practical rank number within the allocation of resources. It should be appreciated that at least some of the variations and modifications described in relation to the previous embodiment can also be used, if appropriate with this embodiment.

Figure 6:
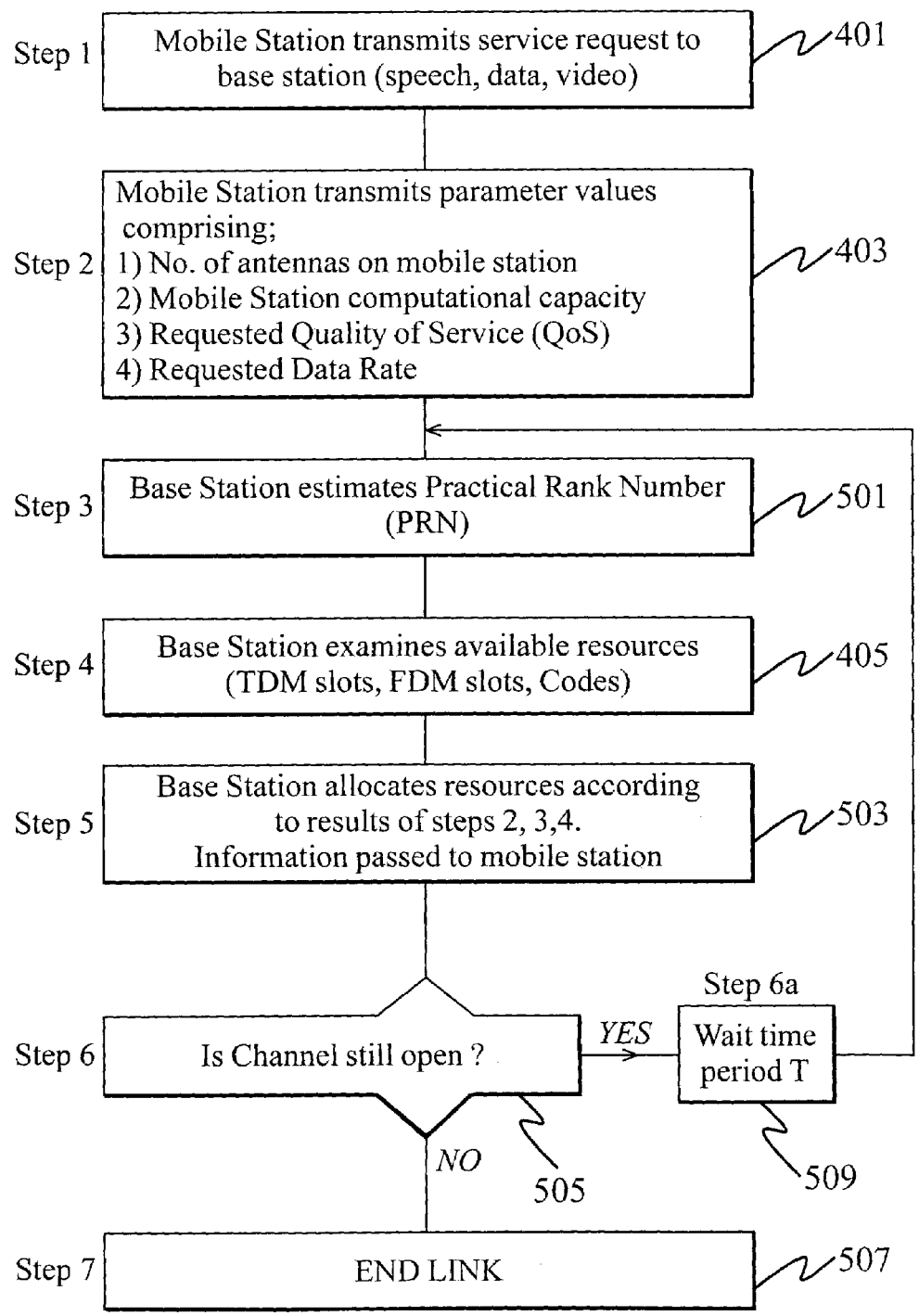
FIG. 6 shows a flow diagram of a second method embodying the present invention

With reference to FIG. 6, the first step, step 1 occurs when the mobile station or base station transmits a service request similar to that transmitted by step 1 of the previous embodiment.

The mobile station, in step 2, transmits a series of parameter values. This effectively provided open loop measurements. The parameter values are similar to those transmitted within the previous embodiment, and can comprise any or all of; the number of antennas on the mobile station, the mobile station computational capacity limit, the requested quality of service, and the requested data rate. As with the previous embodiment the base station may also provide similar information to the decision making entity.

In the next step, step 3, the base station or mobile station estimates the practical rank number of the link between the mobile station and the base station. This is carried out by the Practical Rank Number estimation circuitry 153 and can be completed according to any of the methods previously disclosed. If the mobile station carries out this estimation, the mobile station sends the estimated practical rank number to the base station.

The Resource Allocation Circuitry 157 within the base station examines the available resources, such as the available TDM slots, FDM slots, codes, antennas are calculated. The controller then progresses to step 5.

Step 5, comprises the step where the base station controller circuitry allocates resources according to the information provided by steps 2, 3 and 4. These allocated resources can be time division multiplex slots, frequency division multiplex slots, codes, antennas. This step can take into account closed loop measurements of the channel, which can be taken at any suitable point in the method.

The allocation of resources is carried out by the addition of control signals to the Forward error correction encoder 181 (R), the interleaver 182 ($N_f$), The multiplexer 183 ($M_v$), the space-time multiplexer 184 (K,T,$N_b$), and the beamformer (W). Embodiments of the present invention may by using different values allocate different TDMA slots to different users, different Frequency bands to different users, different (spreading) codes to different users.

Embodiments of the present invention can provide information to the space-time modulator. The space-time modulator in dependence of the control signal can select both the space-time modulation basis, and the space-time code which is advantageous with accordance to the detected communications environment, and/or receiver complexity, and/or receiver antenna array complexity.

The space-time modulator can in further embodiments puncture the space-time code in order to advantageously provide additional diversity to a signal in order to advantageously use the code to provide transmit capacity, and or receive decode simplicity.

An embodiment of such a control system is exemplified in table 2 where the controller may select a transmit mode (K,R, $M_v$), dependent on the mobile information provided by step 2, the available resource list provided by step 3 and the practical rank number of the communications link provided by step 4.

TABLE 2

Bandwidth efficiencies of an embodiment of
the present invention's modes of the system

| K | R | $M_v$ | $E_{bw}$ |
|---|---|---|---|
| 16 | 3/4 | 4 | 48 |
| 16 | 1/2 | 4 | 32 |
| 16 | 3/4 | 2 | 24 |
| 16 | 1/2 | 2 | 16 |
| 8 | 3/4 | 8 | 48 |
| 8 | 3/4 | 6 | 36 |
| 8 | 1/2 | 8 | 32 |
| 8 | 3/4 | 4 | 24 |
| 8 | 1/2 | 6 | 24 |
| 8 | 1/2 | 4 | 16 |
| 8 | 3/4 | 2 | 12 |
| 8 | 1/2 | 2 | 8 |
| 4 | 3/4 | 8 | 24 |
| 4 | 3/4 | 6 | 18 |
| 4 | 1/2 | 8 | 16 |
| 4 | 3/4 | 4 | 12 |
| 4 | 1/2 | 6 | 12 |
| 4 | 1/2 | 4 | 8 |
| 4 | 3/4 | 2 | 6 |
| 4 | 1/2 | 2 | 4 |
| 2 | 3/4 | 8 | 12 |
| 2 | 3/4 | 6 | 9 |
| 2 | 3/4 | 4 | 6 |
| 2 | 1/2 | 4 | 8 |
| 2 | 1/2 | 4 | 6 |
| 2 | 1/2 | 4 | 4 |
| 2 | 3/4 | 2 | 3 |
| 2 | 1/2 | 2 | 2 |
| 1 | 3/4 | 8 | 6 |
| 1 | 3/4 | 6 | 4.5 |
| 1 | 3/4 | 4 | 3 |
| 1 | 1/2 | 8 | 4 |
| 1 | 1/2 | 6 | 3 |
| 1 | 1/2 | 4 | 2 |
| 0 | 0 | 0 | 0 |

Each line in the table defines a different possible transmission mode. The last mode is the "no transmission" mode. The column K is defined as the number of parallel channels to be transmitted. This can be effected either by selecting K antennas to transmit from, or by implementing more involved schemes e.g. in the space-time modulator 184 and beam-forming circuit 185. Each part (symbol) of a parallel stream may be transmitted from more than one antenna and possibly during more than one time slot. The space-time modulator 184 and beam-forming circuit 185 were discussed above.

The column R is defined as the rate of the concatenated code, or the effective information content found within a single bit. As is known in the art to overcome noise and other interference error correction codes and/or interleaving schemes are embedded within the data. These error correction codes effectively contain no additional data and therefore reduce the average information contained within a single bit so that R represents this average value.

The column $M_v$ is defined as the number of bits required to form a symbol from the constellation alphabet used in transmission. For example embodiments of the invention using the modulation techniques known in the art as Quadrature Phase Shift Keying (QPSK) or 16-Quadrature Amplitude Modulation (16-QAM) have $M_v$ values of 2 and 4 respectively. The column EBW is the effective bandwidth efficiency, formed by multiplying the three other column values and is measured in bits per symbol per Hz.

In embodiments of the invention the controller attempts to select the mode where the number of parallel channels K is big as possible, with K being less than or equal to the PRN. The optimal controller setting though in embodiments should be performed up to the constraint values set by the traffic conditions and details of the connection request.

Step 6 determines whether or not the channel is still open. If it is, it passes to step 6a where a time period T is waited before the controller re-estimates the practical rank number and passes back to step 3. If the channel is now closed or no longer requested the link is ended in step 7.

The time period T, the time between PRN measurements should be typically shorter than typical long term channel characteristics changes. A typical user moving a 3 km per hour ½ kilometre from the user equipment should be PRN estimated with a delay between estimations of between 0.1 and 0.01 of a second. In other words the PRN measurement should be performed at a frequency of between 10 and 100 Hz and the allocation of resources dynamically updated at this rate.

In embodiments of the present invention the controller circuitry may also support scheduling algorithms, which take the PRN measurements, possible short term fading measurements, and request from several user into account to schedule transmissions to different users during best possible time slots.

With more information about the channel matrix H at the transmitter, the beam-forming circuitry may be controlled in more sophisticated ways in further embodiments of the invention. K parallel streams may be transmitted on e.g. the K eigenvectors of $H^H H$ with the largest singular/eigenvalues, or to K vectors constructed by independent component analysis (ICA). The eigen/ICA vectors may be constructed by methods known in the art.

Embodiments of the present invention may control the space-time modulation circuitry 184 in order that sequences of space-time modulation schemes contain a different number of parallel streams.

In addition to a space-time modulation of the type described in the equations (2, 4-6), where the number of parallel streams equals the number of transmit antennas, the RAC 157 may also incorporate coding or modulation methods where code blocks do not overlap (in other words pure STTD code blocks as shown in equation (2)).

Thus in one embodiment of the invention the Resource Allocation Circuitry controller 157 is able to replace a code for $N_t=2L$ transmit antennas comprising of L $C_2$ code blocks, with a totality of 2L parallel data streams, with L STTD blocks, and with L parallel data streams. Further, in this embodiment the Resource Allocation Circuitry 157 controller may control the space-time modulator 184 to transmit only L/2 parallel streams, by using only L/2 STTD blocks. The output of the space-time modulator would be a 2×L matrix, and the number of independent streams K=L/2. The beam-forming circuitry 185 then constructs beams to transmit the $N_b=L$ outputs of the space-time modulator 184 from $N_t=2L$ antennas by using a transformation matrix W with dimensions L×2L. This matrix W effectively provides weights to the different beams which take into account for example the condition of the channel. The state of the channel can be derived from the open and/or closed loop measurements. This function is provided by the associated matrix generating and applying circuitry 154. The matrix W may change relatively quickly to take into account rapid changes in the radio channel.

In preferred embodiments, the transformation matrix W is of the randomized beam-forming type discussed above Further, in this embodiment the RAC controller 157 may direct the space-time modulator to transmit fewer parallel STTD blocks, until ultimately there is only one STTD block, corresponding to a single K=1 parallel stream, and $N_b$=2. The output of the space-time modulator 184 would be the 2×2 matrix C as seen in equation (2). The beam-forming circuitry 185 would construct two beams out of the $N_t$=2L transmit antennas by applying a 2×2L beam-forming transformation matrix W. In other words the transmit scheme embodied would reduce to transmitting one STTD block from two beams each formed by L antenna elements.

An example of different modes applied by this embodiment of the invention are shown below in Table 3. These modes may be switched among by the resource allocation circuitry 157, based on the most recent PRN measurement, as well as other parameters of the system, as discussed above in relation to FIG. 6.

TABLE 3

Sequence of adaptation of a 16-transmit scheme to increased antenna correlation, from full TxD-MIMO to STTD 2 beams.

| Parallel Streams K | R | Modulation Scheme | M | $E_{b/w}$ | TX Structure | Tx-beams × antennas/beam |
|---|---|---|---|---|---|---|
| 16 | ½ | QPSK | 2 | 16 | 8 × C2 | 16 × 1 |
| 8 | ½ | 16-QAM | 4 | 16 | 8 × STTD | 16 × 1 |
| 4 | ½ | 64-QAM | 6 | 12 | 4 × STTD | 8 × 2 |
| 2 | ¾ | 256-QAM | 8 | 12 | 2 × STTD | 4 × 4 |
| 1 | ¾ | 256-QAM | 8 | 6 | 1 × STTD | 2 × 8 |

Embodiments of the present invention may extend a scalable code in any orthogonal available transmission resource, these may include frequency division, spreading code division, OFDM sub-carriers and wavelets.

Embodiments of the present invention have the advantage that they are scalable. In other words, it is a relatively simple matter to deal with an increased number of antennas but simply scaling up equation (2) as described earlier.

These scalable codes are also capable of being punctured in order to allow transmission to receivers with poor receive diversity but without needing to reduce the number of transmit beams.

Embodiments of the present invention are particularly applicable to systems where not all the base stations and the mobile stations are the same. For example the mobile stations may have one or more antennas and different capabilities and the base stations may have one or more antennas. This means that embodiments of the present invention are able to work well in for example environments where not all base stations and mobile stations have been updated to include this capability and/or where different locations have different base station requirements.

Embodiments of the present invention may be applied to any multiple access scheme known in the art, including CDMA, FDMA, SDMA or any combination of theses.

Embodiments of the present invention may use any concatenated coding scheme, with or without interleaving, and any modulation scheme.

Embodiments of the present invention may alternatively be found in a communication network arranged without a cellular structure, and may be based on links between possibly mobile users, as in so called ad hoc networks.

Embodiments of the present invention may also be used in a communications network based on a mixture of ad hoc and cellular structures. Indeed embodiments of the present invention may be used with any communication system where there are two entities which may have one or several antennas.

Embodiments of the present invention have been described in the context of communications between a mobile station and a base station. It should be appreciated that embodiments of the present invention are applicable to wireless communication between any two entities.

In these embodiments the circuitry and methods described as being found in the base station in the above embodiments are found within the mobile stations.

In other embodiments of the invention the data to be transmitted may be coded with a forward error correcting code after the data stream has been divided into a plurality of data streams.

Also in other embodiments of the present invention interleaving may be carried out before or after dividing to a plurality of data streams. The interleaving may follow forward error coding, or forward error correction encoding may be performed between one or more interleaving schemes.

In further embodiments interleaving may be performed before or after modulation.

Correspondingly, interleaving may be performed in other embodiments at the bit, symbol or coordinate level, as is known in the art.

If in other embodiments of the present invention FEC/interleaving is performed at last partially after splitting into K independently modulatable data streams, the FEC/interleaving schemes for different data streams may be different.

Also, as different sets of antenna elements may have better channel links to different users, these antenna elements may be used to transmit to the users that are best served by those antenna elements.

In further embodiments of the present invention the resource allocation circuitry 157 may use spatial division multiple access methods, where directional antennas are used to target beams to users at different spatial locations.

The antennas may be chosen based on (possibly long-term) up-link measurements, or downlink measurements with closed-loop signalling. The transmit antennas with as small a correlation as possible are chosen.

Embodiments of the present invention may also control the beam-forming circuitry 185 using the RAC controller 157 using additional side information, i.e. detailed information at the transmitter about the radio channel environment 107, as is known in the art. This radio channel environment information 107 may be based on uplink measurements (open loop), or downlink measurement (closed loop).

Short term channel information concerns the instantaneous channel state. In TDD (time division duplexing) the instantaneous channel state information is based on measurements of the uplink channel. In embodiments featuring FDD (frequency division duplexing) the instantaneous channel state information is based on measurements from the downlink channel, which is appropriately quantized and conveyed from the receiver to the transmitter on a feedback channel.

Long term channel information concerns correlations of the transmit and/or receive antennas. Correlation can be measured from uplink signals in embodiments featuring both TDD and FDD systems. More reliable results for FDD embodiments can be acquired from a downlink measurement at the receiver.

Further embodiments of the beam-forming circuitry 185 in this invention may improve performance by controlling the values for the pseudo-random sequence w(t) based on feedback from the Mobile Station to the Base Station.

The invention claimed is:

1. A system comprising:
   a plurality of transmitters and receivers, wherein each transmitter comprises at least one transmitter element and each receiver comprises at least one receiver element and wherein one of said plurality of transmitters is configured to transmit to one of said plurality of receivers, said one of said plurality of transmitters further comprising
data transmitting circuitry,
determining circuitry configured to determine an estimated value based on at least one parameter of said one of said plurality of transmitters, at least one parameter of said one of said plurality of receivers, and at least one parameter of a wireless environment between said one of said plurality of transmitters and said one of said plurality of receivers, and
controller circuitry configured to control said data transmitting circuitry and said at least one transmitter element in accordance with said estimated value,
wherein said estimated value is a practical rank number, wherein said practical rank number is defined as the number of singular values of a matrix H above a threshold value, where H is a channel transfer matrix, and said practical rank number is no greater than the smallest of the number of said transmitter elements and the number of receiver elements of said one of said plurality of receivers.

2. A system as claimed in claim 1, wherein said system is a cellular communication system.

3. A system as claimed in claim 1, wherein said one of said plurality of transmitters comprises one of a base station and a mobile station and/or said one of said plurality of receivers comprises one of a base station and a mobile station.

4. A system as claimed in claim 1, wherein said at least one parameter of said one of said plurality of transmitters comprises at least one of:
number of antennas;
number of substantially orthogonal transmission resources;
available antenna polarisations; or
modulation scheme.

5. A system as claimed in claim 1, wherein said at least one parameter of said one of said plurality of receivers comprises at least one of:
number of antennas;
service required by said receiver;
one or more parameters of said service required by said receiver;
computational capacity of said receiver;
quality of service required by said receiver; or
data rate required by said receiver.

6. An apparatus, comprising:
a plurality of transmitter elements;
a data transmitter; and
a processor configured to determine an estimated value based on at least one parameter of said apparatus, at least one parameter of a receiver to which said apparatus is configured to transmit, and at least one parameter of a wireless environment between said apparatus and said receiver comprising a plurality of receiver elements, and to control said data transmitter and said transmitter elements in accordance with said estimated value,
wherein said estimated value is a practical rank number, wherein said practical rank number is defined as the number of singular values of a matrix H above a threshold value, where H is a channel transfer matrix, and said practical rank number is no greater than the smallest of the number of transmitter elements and the number of receiver elements of said receiver.

7. An apparatus as claimed in claim 6, wherein said at least one parameter of said apparatus comprises at least one of:
number of transmitter elements;
available time slots;
available frequency;
available frequency subcarrier;
available codes; or
transmitter element polarization.

8. An apparatus as claimed in claim 6, wherein said at least one parameter of said receiver comprises:
number of receiver elements;
computational capacity of said receiver;
service required by said receiver; one or more parameters of a service required by said receiver; quality of service required by said receiver; and
data rate required by said receiver.

9. An apparatus as claimed in claim 6, wherein said at least one parameter of said wireless environment comprises:
propagation characteristics of said wireless environment.

10. An apparatus as claimed in claim 6, wherein said data transmitter is configured to send a signal to said receiver, said processor being configured to estimate said practical rank number using said signal.

11. An apparatus as claimed in claim 6, wherein said processor is configured to estimate said practical rank number from a signal sent from said receiver.

12. An apparatus as claimed in claim 11, wherein said sent signal is a reference signal.

13. An apparatus according to claim 6, wherein said practical rank number is defined with reference to at least one of a relative threshold, an absolute threshold.

14. An apparatus according to claim 13 wherein said relative threshold is defined by a constant times the average value of all of the singular values.

15. An apparatus according to claim 13, wherein said absolute threshold is defined by the signal to noise interference ratio.

16. An apparatus as claimed in claim 6, wherein said practical rank number is used by said processor in determining at least one of coding, modulation, power, beam forming, interleaving, error correction, or antenna arrangement of said apparatus.

17. An apparatus as claimed in claim 6, wherein the number of different parallel channels transmitted on the same set of orthogonal transmission resources is less than or equal to said practical rank number.

18. An apparatus as claimed in claim 17, wherein said set of orthogonal transmission resources comprises at least one of frequency, frequency sub-carrier, code, spreading code, time, time slot and direction.

19. An apparatus as claimed in claim 6, further comprising:
a beam transmitter, wherein said beam transmitter is configured to generate at least one beam to be transmitted by said transmitter elements.

20. An apparatus as claimed in claim 19, wherein said beam transmitter is configured to weight signals to be transmitted by different transmitter elements.

21. An apparatus as claimed in claim 20, wherein said signals are weighted in accordance with the wireless environment between said apparatus and receiver.

22. An apparatus as claimed in claim 6, wherein said processor is configured to control a scalable space time code.

23. An apparatus as claimed in claim 22, wherein said scalable space time code is in the form:

$$C_2 n(S_{1-2} x 2n) = [C_n(S_{1-2n}) C_n(S_{(2n+1)-2 x 2n})],$$

where $C_{2n}$ is a space-time coding matrix for 2n transmitter elements, $C_n$ a space-time matrix for n transmitter elements and $S_1$ to $S_{2n}$, $S_{n+1}$ to $S_{2 \times 2n}$ are the encoded symbols, wherein $$C_1 = \begin{bmatrix} S_1 & S_2 \\ -S_2^* & S_1^* \end{bmatrix}$$

and $$C_2(\vec{s}_{1-4}) = \begin{bmatrix} S_1 & S_2 \\ -S_2^* & S_1^* \end{bmatrix} + U \begin{bmatrix} S_3 & S_4 \\ S_4^* & -S_3^* \end{bmatrix}$$

and U is a unitary 2×2 matrix with determinant=1.

24. The apparatus as claimed in claim 6, further comprising:
a beam transmitter configured to transmit a plurality of beams to said receiver,
wherein said processor is configured to multiply a stream of symbols to be transmitted by a first number (n) of transforms to generate a resultant transformation used in the generation of said beams, and
wherein said first number (n) of transforms used are selected in dependence on said practical rank number.

25. An apparatus as claimed in claim 24, wherein said processor is configured to select said first number (n) of transforms from a set of a second number (in) of transforms, where said second number (in) is greater than or equal to said first number (n).

26. An apparatus as claimed in claim 25, wherein a plurality of sets of said transforms are provided, and wherein said processor is configured to select the set of the second number (in) of transforms dependent on at least said practical rank number.

27. An apparatus as claimed in claim 26, wherein said set of the second number (in) of transforms form a basis set of transforms.

28. An apparatus as claimed in claim 27, wherein said sets of transforms are created from at least one of:
Weyl basis sets;
Hadamard basis sets;
Clifford basis sets; or
Alamouti basis sets.

29. An apparatus as claimed in claim 24 wherein said processor is configured to select said first number (n) of transforms in dependence of the capacity of said first number (n) of selected transforms.

30. An apparatus as claimed in claim 29, wherein the capacity of said first number (n) of selected transforms is inversely related to a self-interference between the transforms.

31. An apparatus as claimed in claim 24, wherein at least one of said transforms, and said resultant transformation is represented as a matrix with r rows and c columns.

32. An apparatus as claimed in claim 31, wherein said one of the number of rows and columns is equal to a number of substantially orthogonal transmission resources and the other of the number of said rows and columns is equal to a number of the plurality of beams used to transmit said stream of symbols.

33. An apparatus as claimed in claim 24, wherein said processor is configured to multiply said stream of symbols by said first number (n) of transforms to provide the first number (n) of results, and further configured to combine said first number (n) of results to provide said resultant transform.

34. An apparatus as claimed in claim 33, wherein said apparatus is configured to transmit said symbol stream at a rate defined by the number of complex symbols transmitted per substantially orthogonal transmission resource.

35. An apparatus as claimed in claim 24, wherein said apparatus is configured to transmit the symbol stream comprising the real and imaginary parts of a series of complex symbols.

36. An apparatus as claimed in claim 24, wherein five groups of sets are defined as, $\tilde{B}_1 = \{\beta_{00}, \beta_{01}, \beta_{02}, j\beta_{13}, \beta_{23}, \beta_{33}\}$
$\tilde{B}_2 = \{j\beta_{00}, j\beta_{03}, j\beta_{02}, \beta_{11}, j\beta_{21}, j\beta_{31}\} \tilde{B}_3 32 \{\beta_{10}, \beta_{12}, \beta_{13}, \beta_{21}, \beta_{31}, j\beta_{01}\} \tilde{B}_4 = \{\beta_{03}, j\beta_{10}, j\beta_{11}, j\beta_{12}, j\beta_{23}, j\beta_{33}\}$
$\tilde{B}_5 = \{\beta_{20}, \beta_{30}, \beta_{32}, j\beta_{32}, j\beta_{22}, j\beta_{20}, j\beta_{30}, \beta_{22}\}$
where $\beta_{\mu\nu} = \tau_\mu \hat{x} \tau_\nu, \mu, \nu \in \{0,1,2,3\}$
and $$\tau_0 = I_2 = \begin{bmatrix} 1 & 0 \\ 0 & 1 \end{bmatrix}; \tau_1 = \begin{bmatrix} 0 & 1 \\ -1 & 0 \end{bmatrix}; \tau_2 = \begin{bmatrix} 0 & j \\ j & 0 \end{bmatrix}; \tau_3 = \begin{bmatrix} j & 0 \\ 0 & -j \end{bmatrix}.$$

37. An apparatus as claimed in claim 24, wherein said apparatus is configured to transmit a symbol stream at a rate of one and a half, the first number (n) off transforms selected being defined as $B^{3/2, subopt} = \tilde{B}_1 \cup \tilde{B}_2$.

38. An apparatus as claimed in claim 24, wherein said apparatus is configured to transmit a symbol stream at a rate of two, the first number (n) of transforms selected being defined as $B^{2, subopt} = \tilde{B}_1 \cup \tilde{B}_2 \cup \{\beta_{10}, \beta_{12}\} \cup \{j\beta_{10}, j\beta_{12}\}$.

39. An apparatus as claimed in claim 24, wherein said apparatus is configured to transmit a symbol stream at a rate of three, the first number (n) of transforms selected being defined as $B^{3, subopt} = \tilde{B}_1 \cup \tilde{B}_2 \cup \tilde{B}_3 \cup \{\beta_{20}, \beta_{30}, \beta_{32}, j\beta_{32}, j\beta_{22}, j\beta_{20}\}$.

40. An apparatus as claimed in claim 24, wherein said apparatus is configured to transmit 4 beams, over four substantially orthogonal transmission resources using a set of transforms determined by the Weil basis set comprising 32 elements.

41. An apparatus as claimed in claim 40, wherein four groups of sets are defined as $B_1^W = \{\beta_{11}^W, \beta_{21}^W, \beta_{12}^W, \beta_{22}^W\}, B_2^W = \{\beta_{31}^W, \beta_{41}^W, \beta_{32}^W, \beta_{42}^W\},$ $B_3^W = \{\beta_{13}^W, \beta_{23}^W, \beta_{14}^W, \beta_{24}^W\}, B_4^W = \{\beta_{33}^W, \beta_{43}^W, \beta_{34}^W, \beta_{44}^W\},$ where $\beta_{kl}^W = D^{k-1}\Pi^{l-1}$, for $k = 1, \ldots, 4; l = 1, \ldots, 4$ and $$D = \begin{bmatrix} 1 & 0 & 0 & 0 \\ 0 & e^{j\pi/2} & 0 & 0 \\ 0 & 0 & e^{j\pi} & 0 \\ 0 & 0 & 0 & e^{j3\pi/2} \end{bmatrix}, \Pi = \begin{bmatrix} 0 & 1 & 0 & 0 \\ 0 & 0 & 1 & 0 \\ 0 & 0 & 0 & 1 \\ 1 & 0 & 0 & 0 \end{bmatrix}.$$

42. An apparatus as claimed in claim 41, wherein said apparatus is configured to transmit a symbol stream at a rate of one and a half, the first number (n) of transforms selected being defined as $B^{3/2, W} = B_1^W \cup jB_2^W \cup B_3^W$.

43. An apparatus as claimed in claim 41, wherein said apparatus is configured to transmit a symbol stream at a rate of two, the first number (n) of transforms selected being defined as $B^{2, W} = B_1^W \cup B_2^W \cup jB_1^W \cup jB_2^W$.

44. An apparatus as claimed in claim 41, wherein said apparatus is configured to transmit a symbol stream at a rate of three, the first number (n) of transforms selected being defined as $B^{3,W}=B_1^W \cup B_2^W \cup B_3^W \cup jB_1^W \cup jB_2^W \cup jB_3^W$.

45. An apparatus, comprising:
a plurality of transmitter elements;
a processor configured to receive capability information of a receiver to which said apparatus is configured to transmit; and
a beam transmitter configured to transmit a plurality of beams, said receiver being configured to receive said plurality of beams,
wherein the processor is configured to control said transmitter elements in accordance with at least one parameter of said apparatus; at least one parameter of said receiver; at least one parameter of a wireless environment between said apparatus and said receiver,
wherein said processor is configured to multiply a stream of symbols (x) to be transmitted by a first number (n) of transforms to generate a resultant transformation used in the generation of said beams,
wherein the first number (n) of transforms used are selected dependent on at least one parameter of said apparatus; at least one parameter of said receiver; at least one parameter of a wireless environment between said apparatus and said receiver and the capacity of the first number (n) of selected transforms,
wherein the capacity of the first number (n) of selected transforms is inversely related to the self-interference and the self-interference (SI) of 2KT selected transforms and their symbols is defined by, $$SI = \sum_{i=1}^{i=2KT} \sum_{k=i+1}^{k=2KT} x_i x_k SI^{(i,k)}$$

where $SI^{(i,k)} = \beta_i^* \beta_k + \beta_k^* \beta_i$ and $\beta$ is the transform, and
wherein K is a number of independent modulatable data streams, T denotes how many slots of space-time the modulator extends over.

46. An apparatus, comprising:
a plurality of transmitter elements;
a beam transmitter configured to transmit a plurality of beams to a receiver configured to receive said plurality of beams; and
a processor configured to control said transmitter elements in accordance with at least one parameter of said apparatus; at least one parameter of said receiver; and at least one parameter of a wireless environment between said apparatus and said receiver,
wherein said processor is configured to multiply a stream of symbols to be transmitted by a first number (n) of transforms to generate a resultant transformation used in the generation of said beams,
wherein said processor is further configured to select the first number (n) of transforms used dependent on said at least one parameter of said apparatus;
said at least one parameter of said receiver; and said at least one parameter of a wireless environment between said apparatus and said receiver, wherein said apparatus is configured to transmit the symbol stream comprising the real and imaginary parts of a series of complex symbols and said apparatus is configured to transmit four beams, over four substantially orthogonal transmission resources using a set of transforms determined by the Clifford basis set comprising thirty-two elements,
wherein said Clifford basis set is defined as the 16 real tensor products of the Alamouti basis set and 16 imaginary tensor products of the Alamouti basis set, and
wherein the set of transforms used to transmit said four beams, over said four substantially orthogonal transmission resources are defined as, $$B_0 = \{\beta_{0v}\}_{v=0}^3, \quad B_1 = \{\beta_{1v}\}_{v=0}^3, \quad B_2 = \{\beta_{2v}\}_{v=0}^3, \quad B_3 = \{\beta_{3v}\}_{v=0}^3$$

where $\beta_{\mu v} = \tau_\mu \hat{x} \tau_v, \mu, v \in \{0,1,2,3\}$
and $$\tau_0 = I_2 = \begin{bmatrix} 1 & 0 \\ 0 & 1 \end{bmatrix}; \tau_1 = \begin{bmatrix} 0 & 1 \\ -1 & 0 \end{bmatrix}; \tau_2 = \begin{bmatrix} 0 & j \\ j & 0 \end{bmatrix}; \tau_3 = \begin{bmatrix} j & 0 \\ 0 & -j \end{bmatrix}.$$

47. An apparatus as claimed in claim 46, wherein said apparatus is configured to transmit a symbol stream at a rate of one, the first number (n) of transforms selected being defined as $B^1 = B_0 \cup B_2$.

48. An apparatus as claimed in claim 46, wherein said apparatus is configured to transmit a symbol stream at a rate of one and a half, the first number (n) of transforms selected being defined as $B^{3/2} = B_0 \cup e^{j\pi/3} B_1 \cup e^{-j\pi/3} B_3$.

49. An apparatus as claimed in claim 46, wherein said apparatus is configured to transmit a symbol stream at a rate of two, the first number (n) of transforms selected being defined as $B^2 = B_0 \cup B_1 \cup B_2 \cup B_3$.

50. An apparatus as claimed in claim 46, wherein said apparatus is configured to transmit a symbol stream at a rate of two, the first number (n) of transforms selected being defined as $B^2 = B_0 \cup \tilde{B}_1 \cup \tilde{B}_2 \cup B_3$ where $$\tilde{B}_k = \begin{bmatrix} 1 & 0 & 0 & 0 \\ 0 & 1 & 0 & 0 \\ 0 & 0 & j & 0 \\ 0 & 0 & 0 & j \end{bmatrix} B_k.$$

51. An apparatus as claimed in claim 46, wherein said apparatus is configured to transmit a symbol stream at a rate of two and a half, the first number (n) of transforms selected being defined as $B^{5/2} = B_0 \cup \tilde{B}_1 \cup \tilde{B}_2 \cup B_3 \cup jB_0$ where $$\tilde{B}_k = \begin{bmatrix} 1 & 0 & 0 & 0 \\ 0 & 1 & 0 & 0 \\ 0 & 0 & j & 0 \\ 0 & 0 & 0 & j \end{bmatrix} B_k.$$

52. An apparatus as claimed in claim 46, wherein said apparatus is configured to transmit a symbol stream at a rate of three, the first number (n) of transforms selected being defined as $$B^3 = B_0 \cup \tilde{B}_2 \cup jB_0 \cup j\tilde{B}_2 \cup \sqrt{\frac{N_r}{2N_r-1}}(\tilde{B}_1 + jB_3) \cup \sqrt{\frac{N_r}{2N_r-1}}(j\tilde{B}_1 + B_3)$$

-continued where $$\tilde{B}_k = \begin{bmatrix} 1 & 0 & 0 & 0 \\ 0 & 1 & 0 & 0 \\ 0 & 0 & j & 0 \\ 0 & 0 & 0 & j \end{bmatrix} B_k.$$

53. An apparatus as claimed in claim 46, wherein said apparatus is configured to transmit a symbol stream at a rate of four, the first number (n) of transforms selected being defined as $B^4 = B_0 \cup B_1 \cup B_2 \cup B_3 \cup jB_0 \cup jB_1 \cup jB_2 \cup jB_3$.

54. An apparatus as claimed in claim 46, wherein said apparatus is configured to transmit a symbol stream at a rate of four, the first number (n) of transforms selected being defined as $B^4 = B_0 \cup \tilde{B}_1 \cup B_2 \cup B_3 \cup jB_0 \cup j\tilde{B}_1 \cup j\tilde{B}_2 \cup jB_3$ where $$\tilde{B}_k = \begin{bmatrix} 1 & 0 & 0 & 0 \\ 0 & 1 & 0 & 0 \\ 0 & 0 & j & 0 \\ 0 & 0 & 0 & j \end{bmatrix} B_k.$$

55. A method, comprising:
receiving a stream of symbols (x) to be transmitted;
selecting a first number (n) of transforms in dependence on at least one of a wireless radio environment between a transmitter configured to transmit a plurality of beams and a receiver configured to receive said plurality of beams, at least one receiver characteristic, at least one transmitter characteristic; and the capacity of the first number (n) of transforms;
multiplying said stream of symbols to be transmitted by said n transforms to generate a resultant transformation used in the generation of said beams; and
determining the capacity of the first number (n) of the transforms,
wherein determining the capacity of the first number (n) of transforms comprises
determining the self-interference (SI) of 2KT selected transforms and their symbols is defined by, $$SI = \sum_{i=1}^{i=2KT} \sum_{k=i+1}^{k=2KT} x_i x_k SI^{(i,k)}$$

where $SI^{(i,k)} = \beta_i^* \beta_k + \beta_k^* \beta_i$ and $\beta$ is the transform, and
wherein K is a number of independent modulatable data streams, and T denotes how many slots of space-time the modulator extends over.

56. A method, comprising:
determining an estimated value based on at least one parameter of a transmitter, at least one parameter of a receiver to which said transmitter is to transmit, and/or at least one parameter of a wireless environment between said transmitter and said receiver, wherein each transmitter comprises one or more transmitter elements and each receiver comprises one or more receiver elements; and
controlling said one or more transmitter elements to transmit to said receiver dependent on said estimated value, wherein said estimated value is a practical rank number no greater than the smallest of the number of transmitter elements of said transmitter and the number of receiver elements of said receiver to which said transmitter is transmitting, and wherein said practical rank number is defined as the number of singular values of a matrix H above a threshold value, where H is a channel transfer matrix.

57. A method as claimed in claim 56, wherein determining comprises determining the number of transmitter elements of said transmitter and the number of receiving elements of said receiver to which said transmitter is transmitting.

58. A method as claimed in claim 57, further comprising:
providing scalable space time codes $C_1$ and $C_2$; determining space time codes $C_n$ for said transmission in accordance with the number of transmitter elements; and
transmitting to said receiver in accordance with the determined space time codes, wherein $$C_1 = \begin{bmatrix} S_1 & S_2 \\ -S_2^* & S_1^* \end{bmatrix}$$

and $$C_2(\tilde{s}_{1-4}) = \begin{bmatrix} S_1 & S_2 \\ -S_2^* & S_1^* \end{bmatrix} + U \begin{bmatrix} S_3 & S_4 \\ S_4^* & -S_3^* \end{bmatrix}$$

and U is a unitary 2×2 matrix with determinant=1.

59. A method as claimed in claim 56, wherein said transmitter is configured to transmit a plurality of beams to said receiver, said method further comprising:
receiving a stream of symbols to be transmitted;
selecting a first number (n) of transforms dependent on said practical rank number; and
multiplying said stream of symbols to be transmitted by the first number (n) of transforms to generate a resultant transformation used in the generation of said beams.

60. A method as claimed in claim 59, wherein the selecting a first number (n) of transforms further comprises selecting said first number (n) of transforms from a set of a second number (in) of transforms, where the second number (m) is greater than or equal to the first number (n).

61. A method as claimed in claim 60, further comprising:
selecting said set of second number (in) of transforms from a plurality of sets of said transforms dependent on said practical rank number value.

62. A method as claimed in claim 60, further comprising:
determining the capacity of the first number (n) of selected transforms.

63. A method as claimed in claim 62, wherein determining the capacity of the first number (n) of selected transforms comprises:
determining the self-interference (SI) of 2KT selected transforms and their symbols (x) by, $$SI = \sum_{i=1}^{i=2KT} \sum_{k=i+1}^{k=2KT} x_i x_k SI^{(i,k)}$$

where $SI^{(i,k)} = \beta_i^* \beta_k + \beta_k^* \beta_i$ and $\beta$ is the transform,
wherein K is a number of independent modulatable data streams, and T denotes how many slots of space-time the modulator extends over.

* * * * *

UNITED STATES PATENT AND TRADEMARK OFFICE
CERTIFICATE OF CORRECTION

PATENT NO. : 7,773,685 B2
APPLICATION NO. : 10/349168
DATED : August 10, 2010
INVENTOR(S) : Tirkkonen et al.

It is certified that error appears in the above-identified patent and that said Letters Patent is hereby corrected as shown below:

In the Claims:

Claim 25, column 43, line 28, please delete "(in)" and replace with --(m)--.

Claim 25, column 43, line 29, please delete "(in)" and replace with --(m)--.

Claim 26, column 43, line 34, please delete "(in)" and replace with --(m)--

Claim 27, column 43, line 37, please delete "(in)" and replace with --(m)--.

Claim 36, column 44, line 11, in the equation please delete "32".

Claim 36, column 44, line 14, delete " $\hat{x}$ " and replace with --$\otimes$--.

Claim 46, column 46, line 13, in the equation, delete " $\hat{x}$ " and replace with --$\otimes$--.

Claim 60, column 48, line 41, delete "(in)" and replace with --(m)--.

Claim 61, column 48, line 44, delete "(in)" and replace with --(m)--.

Signed and Sealed this

Fourteenth Day of December, 2010

David J. Kappos
*Director of the United States Patent and Trademark Office*